(12) United States Patent
Ahmed et al.

(10) Patent No.: US 9,450,620 B1
(45) Date of Patent: Sep. 20, 2016

(54) FAST INDIRECT ANTENNA CONTROL

(71) Applicant: Nitero Pty Ltd., Fitzroy, Victoria (AU)

(72) Inventors: Sebastian Ahmed, Austin, TX (US); Richard Steven Richmond, II, Austin, TX (US)

(73) Assignee: Nitero Pty Ltd., Fitzroy, Victoria (AU)

( * ) Notice: Subject to any disclaimer, the term of this patent is extended or adjusted under 35 U.S.C. 154(b) by 0 days.

(21) Appl. No.: 14/749,892

(22) Filed: Jun. 25, 2015

(51) Int. Cl.
*H04B 7/00* (2006.01)
*H04B 1/00* (2006.01)
*H01Q 3/24* (2006.01)
*H01Q 3/36* (2006.01)

(52) U.S. Cl.
CPC .............. *H04B 1/0053* (2013.01); *H01Q 3/24* (2013.01); *H01Q 3/36* (2013.01)

(58) Field of Classification Search
CPC .......... H04B 1/00; H04B 1/053; H01Q 3/24; H01Q 3/26; G06F 11/1004; G06F 13/4243; G06K 19/0723
See application file for complete search history.

(56) References Cited

U.S. PATENT DOCUMENTS

| | | | | |
|---|---|---|---|---|
| 2005/0213399 A1* | 9/2005 | Hoover | ............... | G06F 13/4243 365/191 |
| 2006/0133160 A1* | 6/2006 | Dickin | ............... | G06F 11/1004 365/189.05 |
| 2008/0214132 A1* | 9/2008 | Kurokawa | ............. | H02J 17/00 455/272 |
| 2009/0167532 A1* | 7/2009 | Kang | ................. | G06K 19/0723 340/572.1 |

* cited by examiner

*Primary Examiner* — Thanh Le
(74) *Attorney, Agent, or Firm* — Hickman Palermo Becker Bingham LLP; Adam C. Stone

(57) ABSTRACT

A digital interface and control module and a multi-function digital bus for use in a wireless radio frequency receiver, transmitter, or transceiver that communicates over a millimeter-wave band at multi-gigabit speeds. The control module provides a low power, low cost, small form factor, and low pin-count solution for high-speed control of a multi-gigabit radio frequency circuitry. The control module may be used to steer an antenna array for beamforming including selecting different antennas and different phases in compliance with IEEE 802.11ad/WiGig specifications. The control module may also be used for individually controlling variable gain amplifiers and low noise amplifiers and for phase shift controls, gain settings, and other controls.

22 Claims, 19 Drawing Sheets

FAST INDIRECT ANTENNA CONTROL

TECHNICAL FIELD

The present invention relates generally to multi-gigabit speed radio frequency (RF) communications, and more particularly, to fast indirect antenna control in wireless communications devices that communicate wirelessly over a millimeter wave (mm-wave) radio frequency (RF) band such as, for example, the 60 Gigahertz (GHz) frequency band.

BACKGROUND

The availability of unlicensed mm-wave RF bands is spurring the development of main stream applications that use mm-wave wireless technologies. For example, the Institute of Electrical and Electronics Engineers (IEEE) 802.11ad standard—also known as WiGig to consumers—promises up to 7 Gigabits per second data rate over the 60 GHz frequency band for consumer applications such as wireless transmission of high-definition video.

Communication over mm-wave frequency bands can be implemented in wireless communications devices by a "Wi-Fi" module soldered to a printed circuit board of the device. The Wi-Fi module is typically connected on the printed circuit board to an applications processor (CPU) through a host interface (e.g., Peripheral Component Interconnect Express). Within the Wi-Fi module, there is typically a MAC-PHY integrated circuit that implements the physical networking layer (e.g., the 802.11ad/WiGig physical layer) and the media access control networking layer (e.g., the 802.11ad/WiGig media access control layer). There is also a radio frequency integrated circuit (also referred to as a "RFIC") for controlling an antenna or an array of antennas in wireless communications with one or more other wireless communications devices. The MAC-PHY circuit and the RFIC may be connected by a bi-directional analog signal path and a RFIC control path.

The MAC-PHY circuit may use the RFIC control path to send signals to the RFIC for, among other things, gain and antenna control for real-time beamforming. For example, the RFIC control path may be implemented as a high-speed serial bus. Unfortunately, implementing the RFIC control path as a high-speed serial bus presents a number of potential issues. First, a high-speed serial bus may increase power requirements, which is a drawback for battery-operated wireless communications devices. Second, a high-speed serial bus may require specialized circuitry that increases per-unit cost. Third, using a high-speed serial bus may result in a higher latency implementation due to protocol and packet structure requirements. Fourth, a high-speed serial bus may require high speed clocking using phase locked loops (PLLs) which can have adverse effects on the radio frequency circuitry.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

Introduction

Figure 1A:
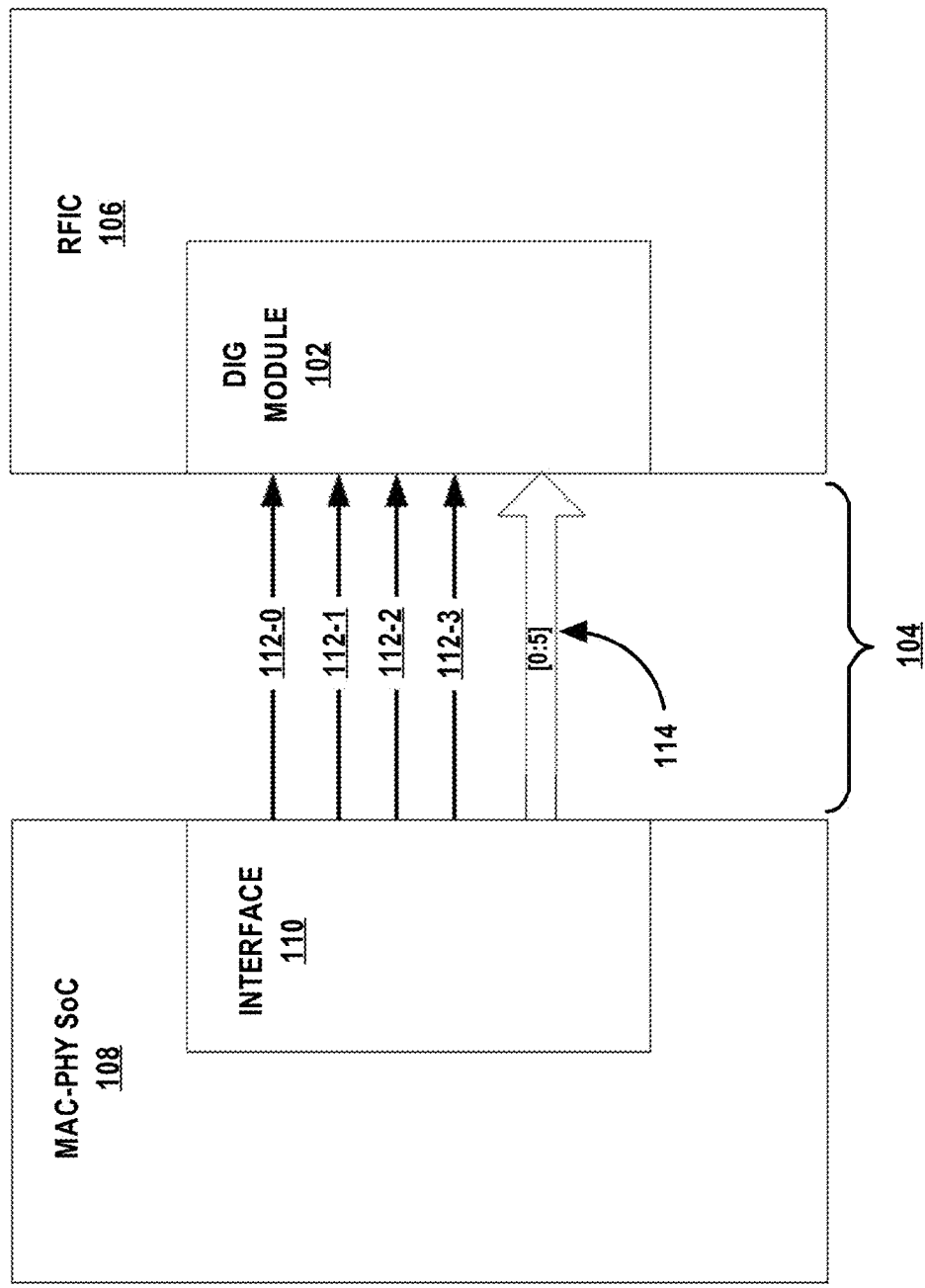
FIG. 1A is a block diagram showing a first example hardware application of the digital interface and control module and the multi-function digital bus of the present invention, according to an embodiment.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

The following briefly describes the embodiments of the subject innovations in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Overview

Briefly stated, subject innovations are directed toward a digital interface and control module (also referred to hereinafter as "the DIG module") and a multi-function, low pin-count digital bus (also referred to hereinafter as "the multi-function bus") for use in a wireless RF receiver, transmitter, or transceiver that communicates over a mm-wave band at multi-gigabit speeds. In an embodiment, the DIG module is implemented as a hard macro integrated in a multi-gigabit RFIC.

In an embodiment, the multi-function bus connects a MAC-PHY System on a Chip (SoC) to the DIG module of a multi-gigabit RFIC within a Wi-Fi module of a multi-gigabit wireless communications device such as, for example, a laptop computer, a mobile phone, or other portable or stationary electronic device with the capability of communicating wirelessly at multi-gigabit speeds over a mm-wave RF band such as, for example, the 60 GHz band.

In an embodiment, the multi-function bus supports a number of selectable modes including a dynamic antenna configuration mode allowing selection of one of sixty four (64) different possible antenna configurations using a six (6)-bit index. Each of the sixty four (64) antenna configurations may provide both a receive (RX) decoding and a transmit (TX) decoding. According to an embodiment, the dynamic antenna configuration mode does not require continuous clocking thereby reducing noise and power consumption.

In an embodiment, the DIG module includes a programmable antenna configuration lookup-up-table (LUT). The antenna configuration LUT maps each of the sixty four (64) possible antenna configurations to a fully decoded five hundred and twelve (512)-bit antenna control vector. The bits of the antenna control vector form the final control signals for the RF circuitry without requiring additional processing. In an embodiment, the antenna configuration LUT is implemented with embedded dual-port synchronous random access memories (SRAMs).

Other selectable interfaces supported by the multi-function bus may include a serial peripheral interface (SPI) slave mode allowing command protocol driven, memory mapped access of on-chip registers and memories, a dynamic variable gain amplifier (VGA)/low noise amplifier (LNA) adjustment mode allowing varying VGA/LNA delays without sequential latency, and a decoded high-level mode setting allowing rapid changes to RX/TX direction, power amplifier (PA) gain, and other high-level controls without sequential latency.

As used in this description, the term "serial peripheral interface," for which "SPI" is an abbreviation, refers to the synchronous serial communication interface specification used for short distance communication, primarily in embedded systems. The interface was originally developed by Motorola, Inc. of Schaumburg, Ill. and is a de facto standard. SPI implementations may communicate in full duplex mode using a master-slave architecture.

In an embodiment, to support a glitch free-architecture, each of four selectable modes of the DIG module has a corresponding dedicated mode selection line of the multi-function bus. In an embodiment, a desired one of the four modes can be selected by asserting the corresponding dedicated mode selection line low (0) and asserting the other three mode selection lines high (1).

In an embodiment, the multi-function bus includes a four (4)-bit control plane and a six (6)-bit data plane connected to a total of ten (10) pins of the DIG module to provide a low pin-count implementation and glitch free architecture.

According to various embodiments, the DIG module provides a low power, low cost, small form factor, and low pin-count solution for high-speed control of a multi-gigabit RFIC. The DIG module may be used, for example, to steer an antenna array for beamforming including selecting different antennas and different phases in compliance with IEEE 802.11ad/WiGig specifications. The DIG module may also be used, for example, for individually controlling variable gain amplifiers (VGAs) and low noise amplifiers (LNAs) and for phase shift controls, gain settings, and other controls.

Hardware Applications

There are at least two possible hardware applications of the DIG module and the multi-function bus of the present invention. In a first "system" application, the DIG module is integrated in a multi-gigabit RFIC and the multi-function bus is connected to a MAC-PHY SoC and the DIG module. In a second "config/debug" application, the DIG module is integrated in a multi-gigabit RFIC like in the system application. But the multi-function digital bus is connected to a SPI driver and the DIG module, instead of being connected to a MAC-PHY SoC and the DIG module.

The system application is useful in commercial wireless communications devices (e.g., laptop computers, tablet computers, mobile phones, video gaming consoles, etc.) to provide a low cost, low pin count, small form factor, and low power solution for multi-gigabit wireless communications in such devices.

The config/debug application is useful for configuring or debugging the DIG module. For example, the config/debug application may be used to configure or debug the DIG module or the RFIC prior to connecting the DIG module to a MAC-PHY SoC via the multi-function bus in the system application.

Applications other than the system and the config/debug application are possible and the present invention is not limited to just those two applications. Instead, one skilled in the art will recognize based on the disclosure herein that the DIG module and the multi-function bus of the present invention may be used in other applications to meet the requirements of a particular implementation at hand.

System Application

FIG. 1A is a block diagram showing an example system application of the DIG module 102 and the multi-function bus 104 of the present invention, according to an embodiment. In this example, the DIG module 102 is implemented as a hard macro integrated in a multi-gigabit RFIC 106. In an exemplary non-limiting embodiment, the RFIC 106 is the Nitero RFIC model NT4600R available from Nitero, Inc. of Austin, Tex.

While in some embodiments the DIG module 102 is implemented as a hard macro integrated in the RFIC 106, the DIG module 102 is implemented as a soft macro or a firm macro integrated in the RFIC 106 in other embodiments. Thus, one skilled in the art will recognize based on the disclosure herein that the DIG module 102 is not limited to any particular manufacturing integrated circuit technology.

The DIG module 102 of a multi-gigabit RFIC 106 is connected to an interface 110 of a MAC-PHY SoC 108 via the multi-function bus 104. In an exemplary non-limiting embodiment, the MAC-PHY SoC 108 is the Nitero MAC-PHY SoC model NT4600M available from Nitero, Inc. of Austin, Tex.

The MAC-PHY SoC 108 uses the multi-function bus 104 for passing beamforming related control information from a MAC networking layer (e.g., the 802.11ad/WiGig MAC layer) to the RFIC 106 in a high-speed dynamic manner. In addition, MAC-PHY SoC 108 may use the multi-function bus 104 for sending other control information such as, for example, control information for RFIC operating modes, antenna gain control, and general register control. Thus, the multi-function bus 104 can be used by the MAC-PHY SoC 108 to send control information to the RFIC 106 for different control types such as, for example, beamforming, gain, mode, and serial register control.

The multi-function bus 104 includes four mode selection lines 112-0, 112-1, 112-2, and 112-3 for selecting one of four different operating modes of the DIG module 102. Each of the mode selection lines 112-0, 112-1, 112-2, and 112-3 is connected to a corresponding pin of the RFIC 106.

While in some embodiments the multi-function bus 104 includes four mode selection lines 112 for four different operating modes of the DIG module 102, the multi-function bus 104 includes more than four mode selection lines 112 or fewer than four mode selection lines 112 in other embodiments. For example, multi-function bus 104 may include more than four mode selection lines 112 if there are more than four selectable operating modes of the DIG module 102. Similarly, multi-function bus 104 may include fewer than four mode selection lines 112 if there are less than four selectable operating modes of the DIG module 102.

The multi-function bus 104 also includes a six (6)-bit data plane 114. The data plane 114 includes six data lines. Each of the six data lines is connected to a corresponding pin of the RFIC 106. Thus, a total of ten pins of the RFIC 106 are needed to connect to the mode selection lines 112 and the data plane 114.

While in some embodiments the data plane 114 consists of six data lines, the data plane 114 consists of more than six data lines or fewer than six data lines in other embodiments. For example, if greater than a six (6)-bit width of the data plane 114 is desired, then the data plane 114 may consist of more than six data lines. Similarly, if a less than six (6)-bit wide data plane 114 is needed, then the data plane 114 may consist of fewer than six data lines.

While in some embodiments ten pins of the RFIC 106 are used to connect the control plane 112 and the data plane 114 of the multi-function bus 104 to the DIG module 102, more than ten pins or fewer than ten pins are used in other embodiments. For example, the number of pins of the RFIC 106 used to connect the DIG module 102 to the multi-function bus 104 may vary depending on the number of selectable operating modes of the DIG module 102 and the desired bit-width of the data plane 114.

Config/Debug Application

Figure 1B:
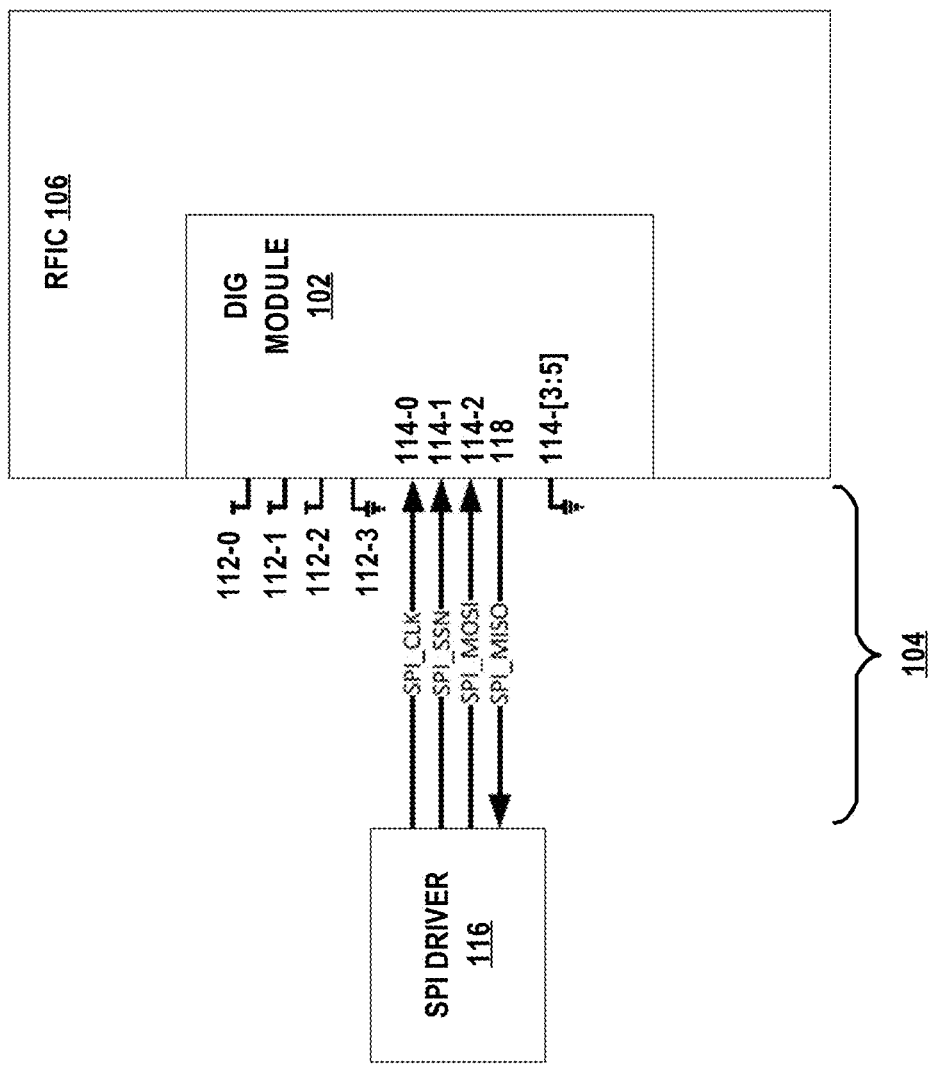
FIG. 1B is a block diagram showing a second example hardware application of the digital interface and control module and the multi-function digital bus of the present invention, according to an embodiment.

FIG. 1B is a block diagram showing an example configuration and debugging hardware application of the DIG module 102 and the multi-function bus 104 of the present invention, according to an embodiment. In this application, the DIG module 102 is integrated in the RFIC 106 like in the system application described above. However, instead of being connected to MAC-PHY SoC 108, the DIG module 102 is connected via the multi-function bus 104 to a SPI driver 116. This application may be used for configuring or debugging the DIG module 102 or the RFIC 106. In this application, the SPI driver 116 functions as the SPI master and the DIG module 102 functions as an SPI slave. It should be noted that in the config/debug application, configuration and debugging of the RFIC 106 can be achieved without the need of the MAC-PHY SoC 108.

The four mode selection lines 112-0, 112-1, 112-2, and 112-3 of the multi-function bus 104 are connected to select a SPI slave configuration mode of the DIG module 102. In particular, lines 112-0, 112-1, and 112-2 are connected to a voltage source and line 112-3 is connected to ground such that the SPI slave configuration mode is selected. In an embodiment, the SPI slave configuration mode of the DIG module 102 is selected by asserting lines 112-0, 112-1, and 112-1 high (1) and asserting line 112-3 low (0).

According to an embodiment, three lines of the six line control plane 114 of the multi-function bus 104 are used for three of the four SPI logic signals SPI_CLK, SPI_SSN, SPI_MOSI, and SPI_MISO. In particular, line 114-0 is used for SPI serial clock output from the SPI driver 116 (SPI_CLK). Line 114-1 is used for the SPI slave select active low output from the SPI driver 116 (SPI_SSN). Line 114-2 is used for the SPI master output, slave input (MOSI) output from the SPI driver 116 (SPI_MOSI).

An output line 118 is used for the SPI master input, slave output (SPI_MISO) output from the DIG module 102. Lines 114-3, 114-4 and 114-5 of the data plane 114 are not used in the config/debug application and may be connected to ground or omitted altogether. Output line 118 may be used only for the config/debug application and is not needed for the system application. Thus, a system application may omit or not use output line 118.

Digital Interface and Control Module and Multi-Function Bus Detail Architecture

Figure 2:
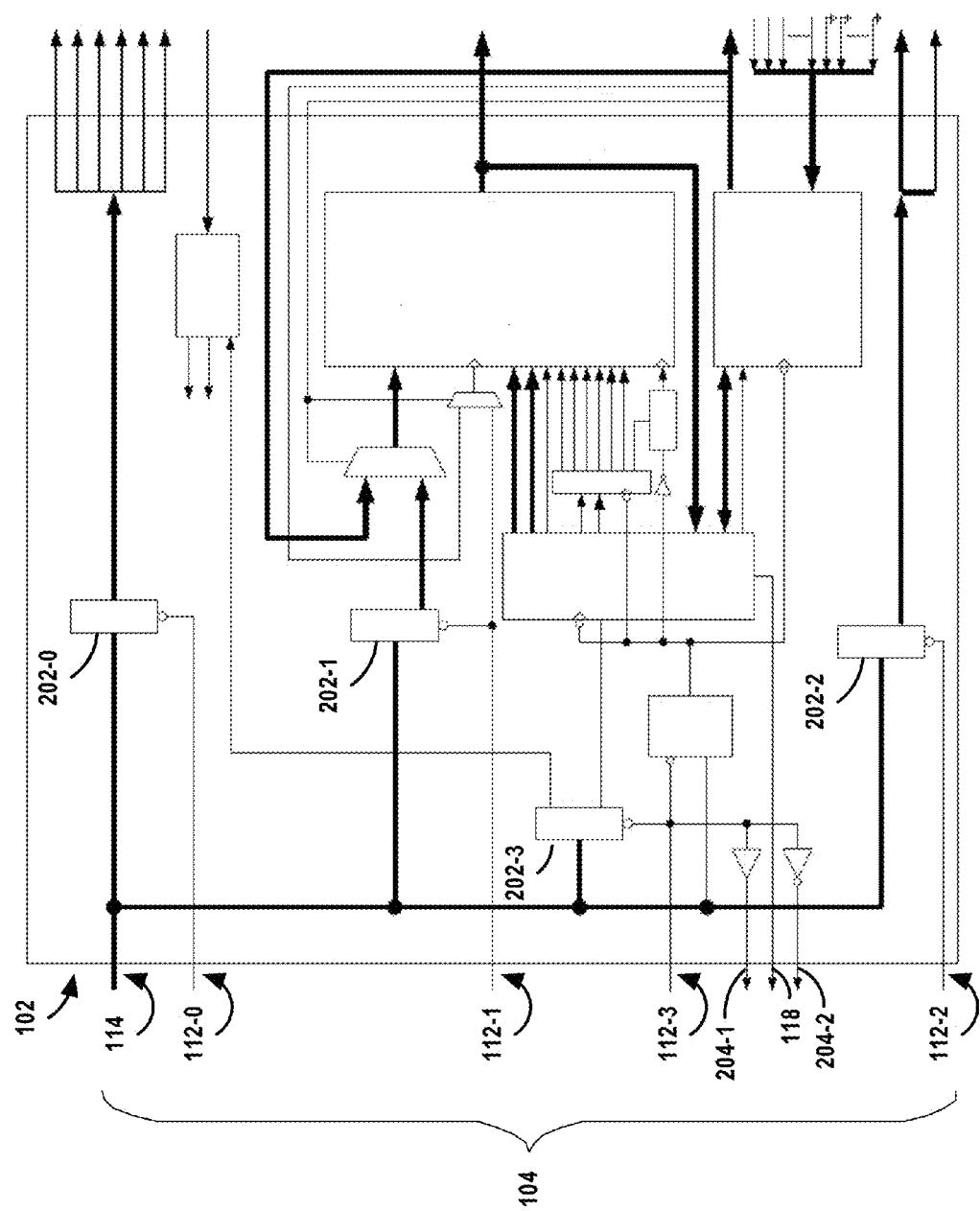
FIG. 2 is a block circuit diagram showing the digital interface and control module and the multi-function digital bus of the present invention in greater detail, according to an embodiment.

FIG. 2 is a block circuit diagram showing the DIG module 102 and the multi-function bus 104 of the present invention in greater detail, according to an embodiment. In the following description of the present embodiment, for the purposes of explanation, numerous specific details are set forth in order to provide a thorough understanding of the present embodiment. It will be apparent, however, that the present embodiment may be practiced without these specific details. In other instances, well-known structures and devices are shown in block diagram form in order to avoid unnecessarily obscuring the present embodiment.

The multi-function bus 104 includes four one (1)-bit mode selection lines 112-0, 112-1, 112-2, and 112-3 and a six (6)-bit data plane 114. The data plane 114 is represented in FIG. 2 as single bolded line. However, it should be understand that when implemented in electronic circuitry, the data plane 114 may be implemented as six separate data lines.

Each of the mode selection lines 112-0, 112-1, 112-2, and 112-3 is connected within the DIG module 102 to a corresponding latch. In particular, mode selection line 112-0 is connected to latch 202-0, mode selection line 112-1 is connected to latch 202-1, mode selection line 112-2 is connected to latch 202-2, and mode selection line 112-3 is connected to latch 202-3. Each mode selection line 112 may be a one-hot, active-low latch enable, for example. Because of the relatively low latency of latches, latency ceiling requirements of a multi-gigabit wireless communications standard such as, for example, beam refinement protocol antenna switching requirements of the IEEE 802.11ad/Wi-Gig standard, can be easily met using latches 202. Further, because a separate mode selection line 112 is dedicated for each of four possible selectable operating modes, a glitch-free architecture is supported.

The multi-function bus 104 may also include output line 118 for use in the SPI slave operating mode. For example, output line 118 may be used for SPI master input, slave output (SPI_MISO) output from the DIG module 102 to the SPI driver 116 in the config/debug application. Two other output lines 204-1 and 204-2 may also be used in the SPI slave operating mode for I/O enabling of the SPI_MISO output line 118. Output lines 118, 204-1, and 204-2 are not required in the system application.

The multi-function bus 104 provides a low-pin count input/output (I/O) footprint without sacrificing support for low-latency dynamic control of RFIC features such as gain and other antenna control. Further, the multi-function bus 104 is designed to operate in an asynchronous manner with glitch free operation.

The mode selection lines 112 define the operating mode of the data plane 114. In an embodiment, one of four operating modes can be selected by asserting a corresponding mode selection line 112 low (0) and asserting the other mode selection lines 112 high (1). In an embodiment, the four operating modes include a SPI slave operating mode, a radio frequency mode select operating mode, an antenna configuration update operating mode, and a receive (RX) antenna gain update operating mode.

SPI Slave Operating Mode

Figure 3A:
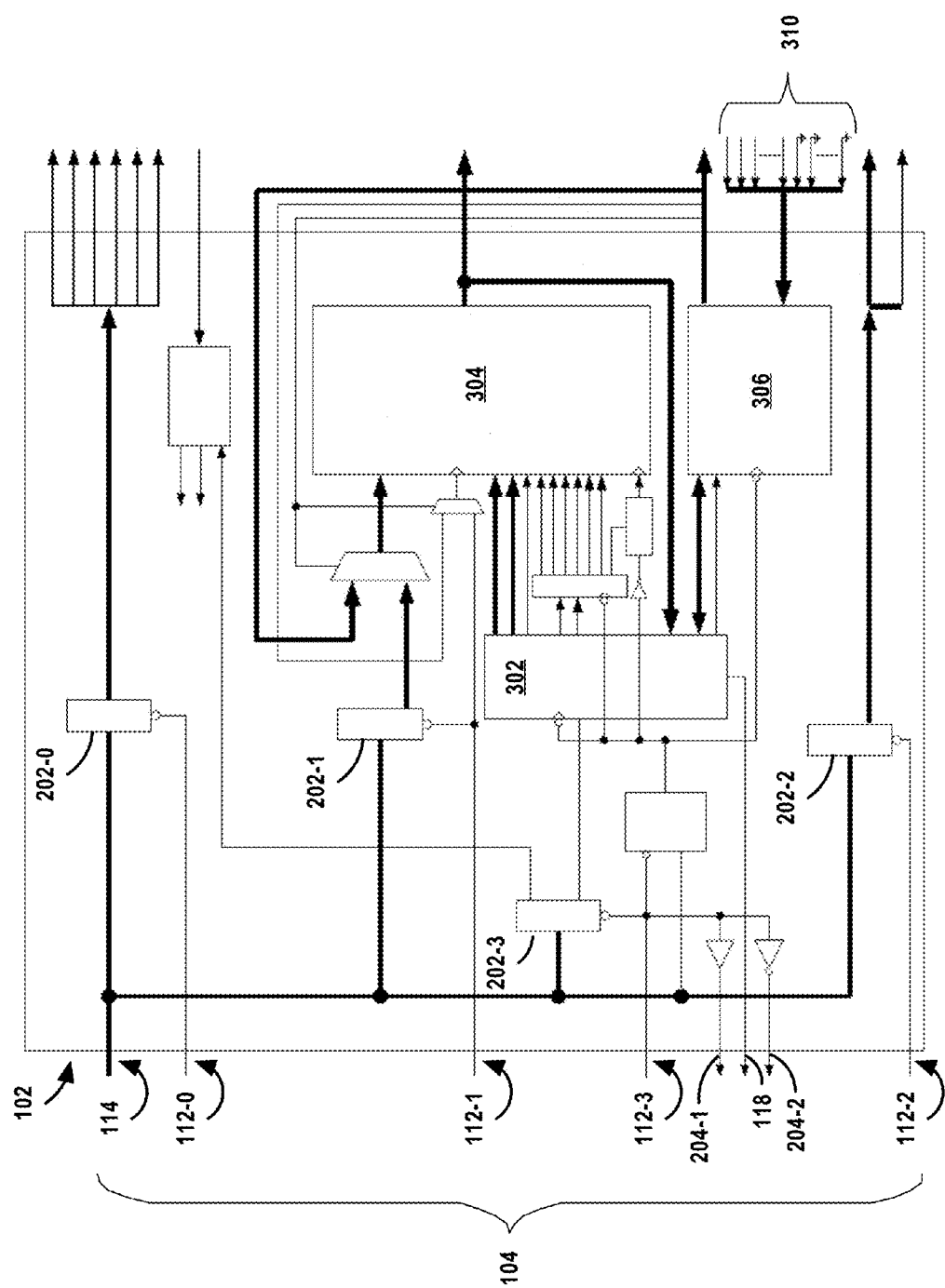
FIG. 3A is a block circuit diagram showing the digital interface and control module and the multi-function digital bus of the present invention in greater detail when the digital interface and control module is in a serial peripheral interface slave configuration mode, according to an embodiment.
Figure 3B:
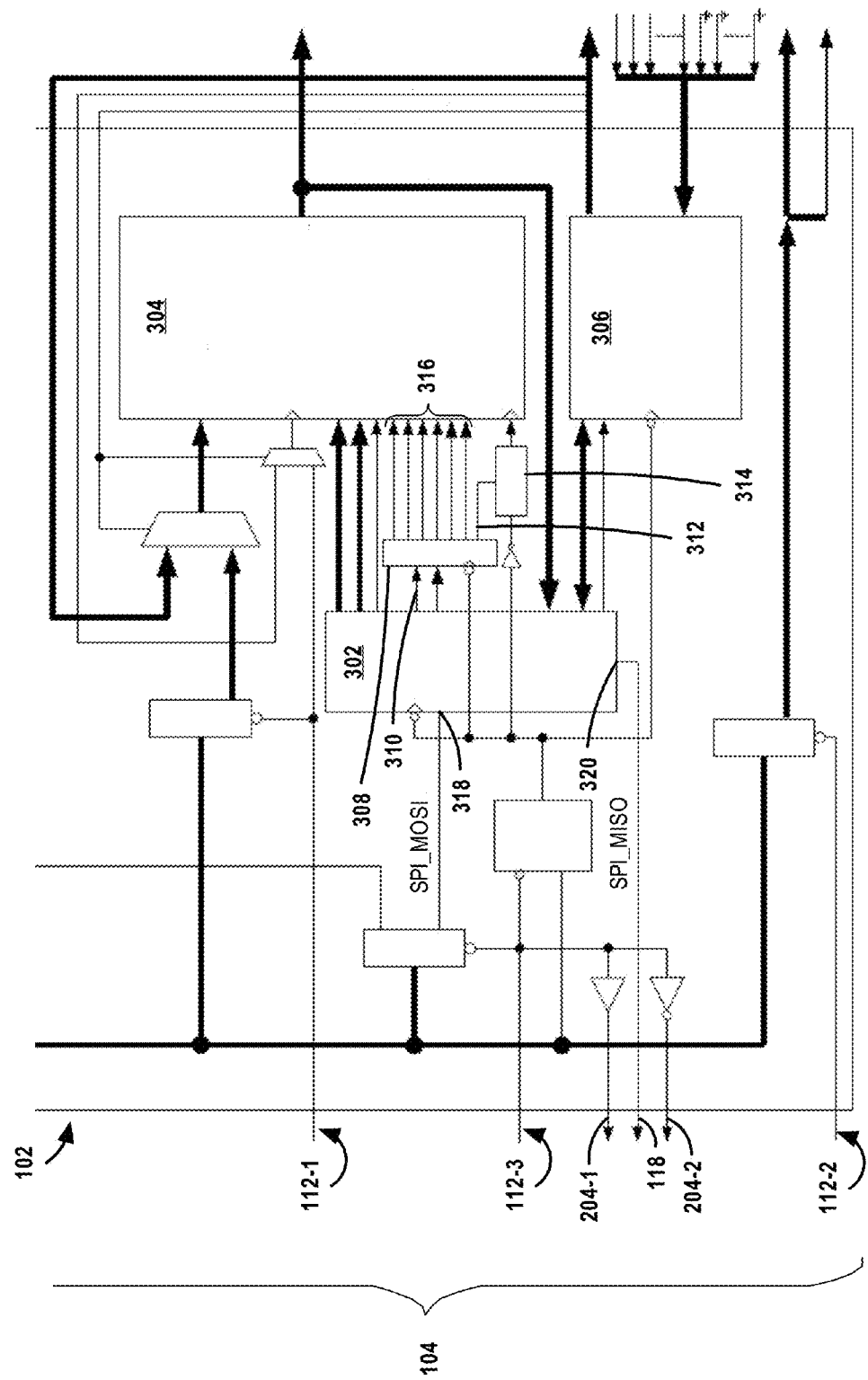
FIG. 3B shows a block diagram showing a portion of the digital interface and control module and the multi-function digital bus of the present invention in greater detail when the digital interface and control module is in the serial peripheral interface slave configuration mode, according to an embodiment.

FIG. 3A is a block circuit diagram showing the DIG module 102 and the multi-function bus 104 of the present invention in greater detail, according to an embodiment. FIG. 3B is a block circuit diagram showing a portion of the DIG module 102 and the multi-function bus 104 of the present invention in greater detail, according to an embodiment. In an embodiment, the SPI slave operating mode is selected by asserting selection line 112-3 low (0) and asserting each of mode selection lines 112-0, 112-1, and 112-2 high (1).

In the SPI slave operating mode, the multi-function bus 104 is re-purposed as a SPI slave port which enables a SPI slave controller module 302. The SPI slave operating mode allows access to memory elements of the DIG module 102 including an antenna lookup table (LUT) memory 304, register bank 306, and random access memory (RAM) register control (RCR) 308.

The SPI slave controller 302 implements an SPI slave controller. The SPI controller 302 interfaces with the block-level SPI signals and the data paths to and from various memories of the DIG module 102 such as the antenna LUT memory 304, the register bank 306, and the RCR 308.

In an embodiment, the antenna LUT memory 304 stores up to sixty four (64) antenna control vectors in sixty four rows of memory. Each of the sixty four (64) antenna control vectors are up to five hundred and twelve (512)-bits in length. In other embodiments, antenna LUT memory 304 is capable of storing more or less than sixty four (64) antenna control vectors at a time. The number of control vectors that antenna LUT memory 304 is configured to store may vary according to the requirements of the particular implementation at hand and other factors such as, for example, the number of different antenna control vectors that are needed to control an antenna array to meet beamforming requirements such as those set forth in a standard or specification such as, for example, the IEEE 802.11ad/WiGig specification. In an embodiment, the antenna LUT memory 304 is implemented with embedded dual-port synchronous random access memories (SRAMs). In an alternative embodiment, antenna LUT memory 304 is implemented with flip-flops.

In an embodiment, antenna LUT memory 304 includes a memory wrapper responsible for instantiating the necessary SRAMs required to provide a five hundred and twelve (512)-bit wide by sixty-four (64) entry deep memory array. The memory wrapper may implement a dual port and dual clock architecture to simplify clock-muxing requirements when integrated in the RFIC 106.

The register bank 306 may house all of the control registers of the RFIC 106 and provide read-muxing of an input status bus 310. The register bank 306 interfaces directly with the SPI controller 302. In an embodiment, the register bank 306 is flop based with an asynchronous read path. In an embodiment, register bank 306 comprises between sixty-four (64) and seventy-nine (79) sixteen (16)-bit registers.

The RCR 308 may house the control register specific to the DIG module 102. In an embodiment, RCR 308 is used to directly control power states and read margins of the SRAMs of the antenna LUT memory 306.

Other types of memory elements of the DIG module 102 may be managed in the SPI slave operating mode. The antenna LUT memory 304, the register bank 306, and the RCR 308 are just some examples of the possible types of memory elements that could be managed in the SPI slave operating mode.

When in the SPI slave operating mode, SPI input frames that implement a SPI command, address, and data protocol may be sent over the data plane 114 to the DIG module 102. For each SPI input frame, a line 114-1 of the six lines of data plane 114 designated as SPI slave select (SPI_SSN) may be asserted low (0). Completion of the frame operation is signaled by de-asserting SPI_SSN high (1). This reduces the amount of framing overhead required to perform a given frame operation while still allowing for dynamically controlled burst sizes.

In an embodiment, SPI input frames are sent over a line 114-2 of the six data lines 114 designated as SPI master output, slave input (SPI_MOSI).

According to an embodiment, a SPI input frame includes a command sub-frame, a dummy sub-frame, and one or more data sub-frames.

Command Sub-Frame

The command sub-frame may include a command value. In an embodiment, the command value is a five (5)-bit value for selecting one of five different possible commands. The five commands include an internal RCR write (RCR_WR), a single or multiple register read (REG_RD), a single or multiple register write (REG_WR), an antenna LUT memory write (LUT_WR), and an antenna control current value read (ANT_RD).

The command sub-frame may also include a start address. In an embodiment, the start address is an eleven (11)-bit value that is command context sensitive. For RCR operations (RCR_WR), the start address contains an eleven (11)-bit control value for the RCR 308. For register write operations (REG_WR), the start address may refer to a particular register in the register bank 306 to start the single or multiple register write at. For register read operations (REG_RD), the start address may refer to a particular register in the register bank 306 to start the single or multiple register read at. For antenna LUT memory write operations (LUT_WR), the start address may refer to one of the five hundred and twelve (512)-bit wide rows of the antenna LUT memory 304 to start a single or multiple antenna configuration write at. For antenna control current value read operations (ANT_RD), the start address is ignored.

Dummy Sub-Frame

The dummy sub-frame may be used to support register read operations (REG_RD) as described in greater detail below.

Data Sub-Frame(s)

The one or more data sub-frames may be used for register write operations (REG_WR), or contain one or more five hundred and twelve (512)-bit antenna control vector(s) for antenna LUT memory 304 write operations (LUT_WR).

Table 1 below lists the five exemplary SPI commands. In an embodiment, all input and output SPI frames are treated as most significant bit (MSB)-first.

TABLE 1

Exemplary SPI Commands

| Command Name | Command Sub-Frame | | | Number of Dummy Sub-Frames | Number of Data Sub-Frames |
|---|---|---|---|---|---|
| | Command [15:11] | Start Address [10:0] | Start Address Type | | |
| RCR_WR | 5'b100000 | Control Value | N/A | 0 | 0 |
| REG_RD | 5'b01111 | 0-79 | 16-bit Register | 1 | 1+ |
| REG_WR | 5'b01010 | 0-63 | 16-bit Register | 0 | 1+ |
| LUT_WR | 5'b00101 | 0-63 (row #) | 512-bit Row | 0 | 1+ |
| ANT_RD | 5'b00110 | Ignored | N/A | 0 | 1 |

Figure 4A:
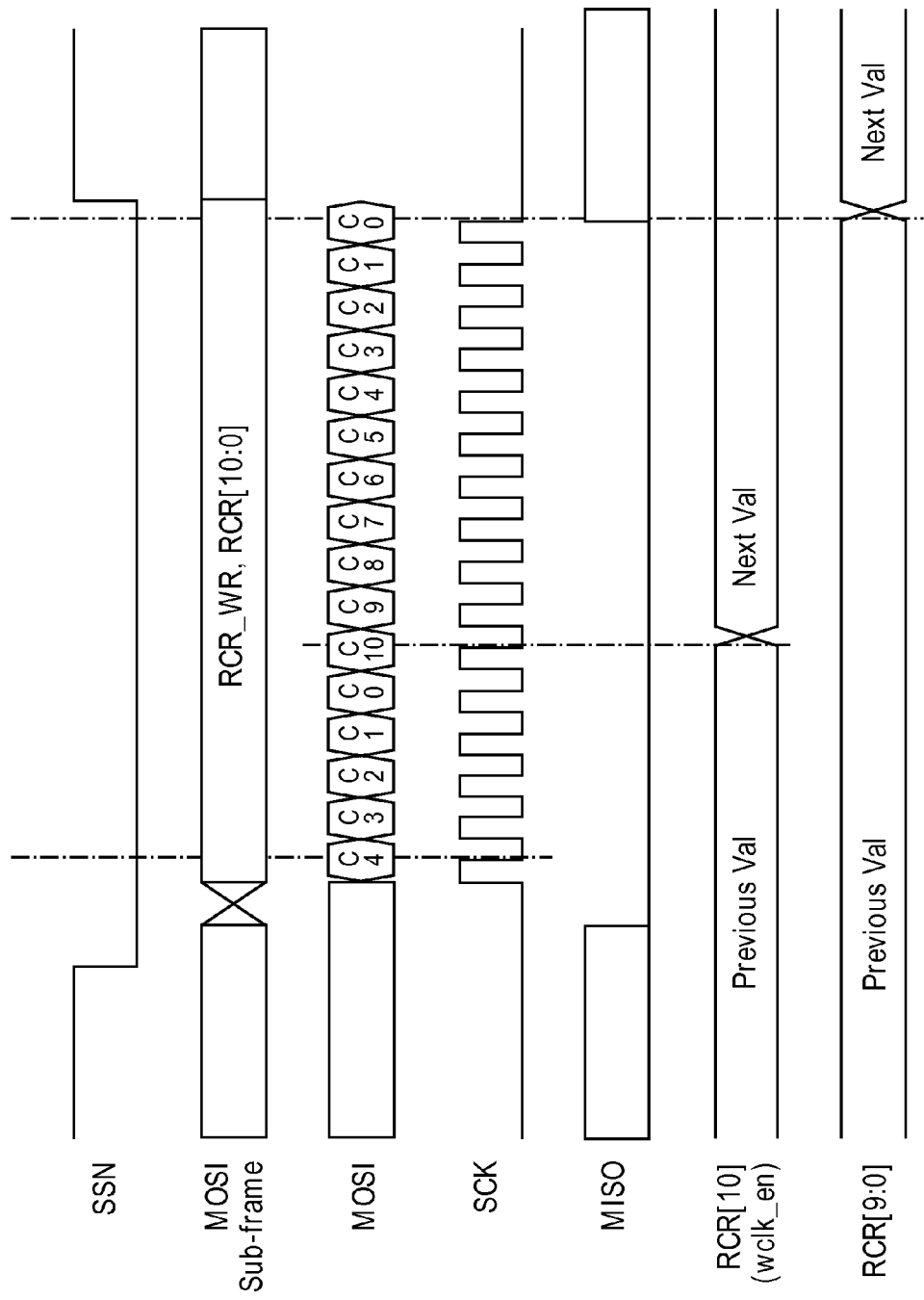
FIG. 4A shows an internal random access memory register control write operation when the digital interface and control module is in the serial peripheral interface slave configuration mode, according to an embodiment.
Figure 4B:
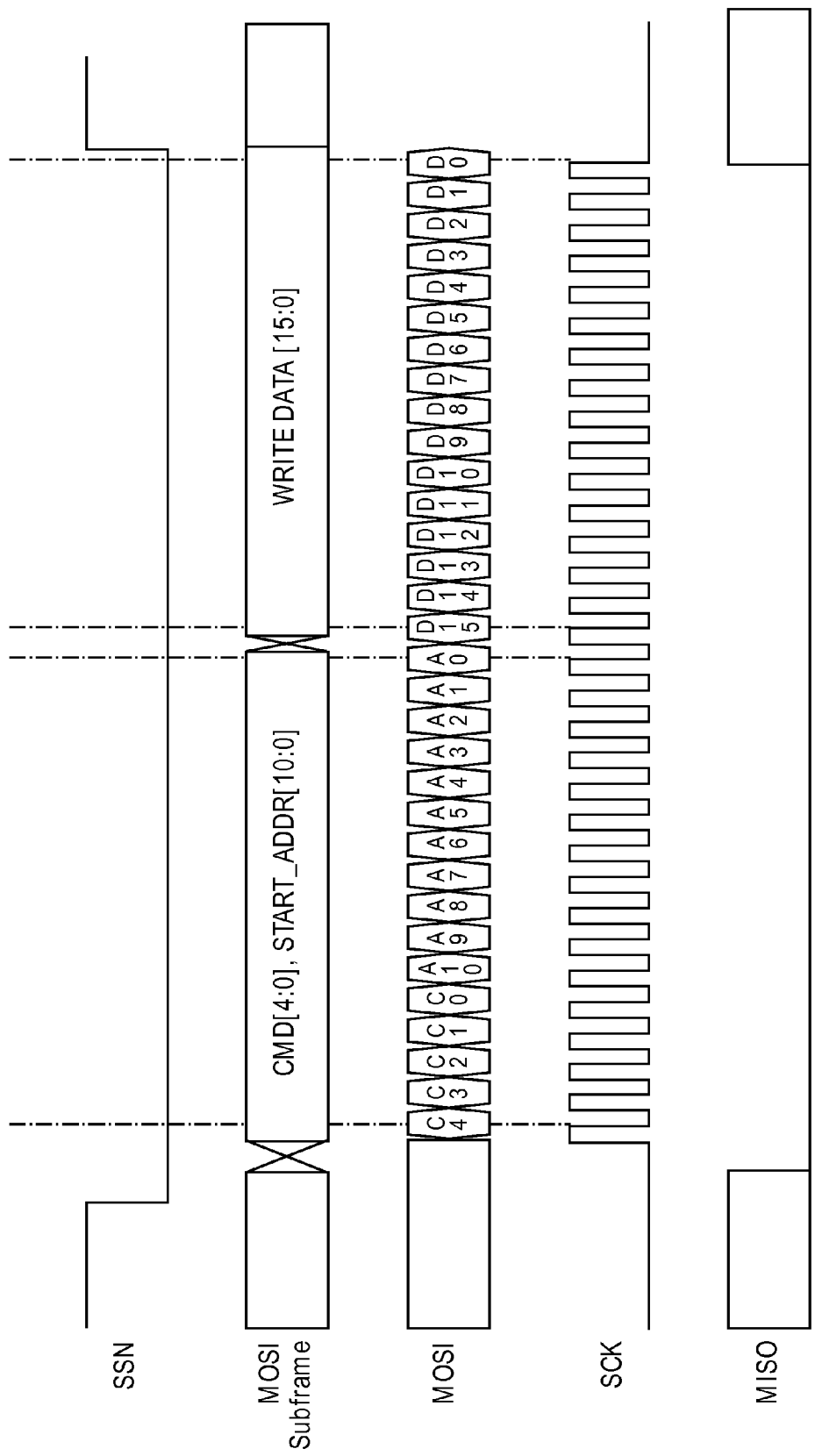
FIG. 4B shows a single register write operation when the digital interface and control module is in the serial peripheral interface slave configuration mode, according to an embodiment.
Figure 4C:
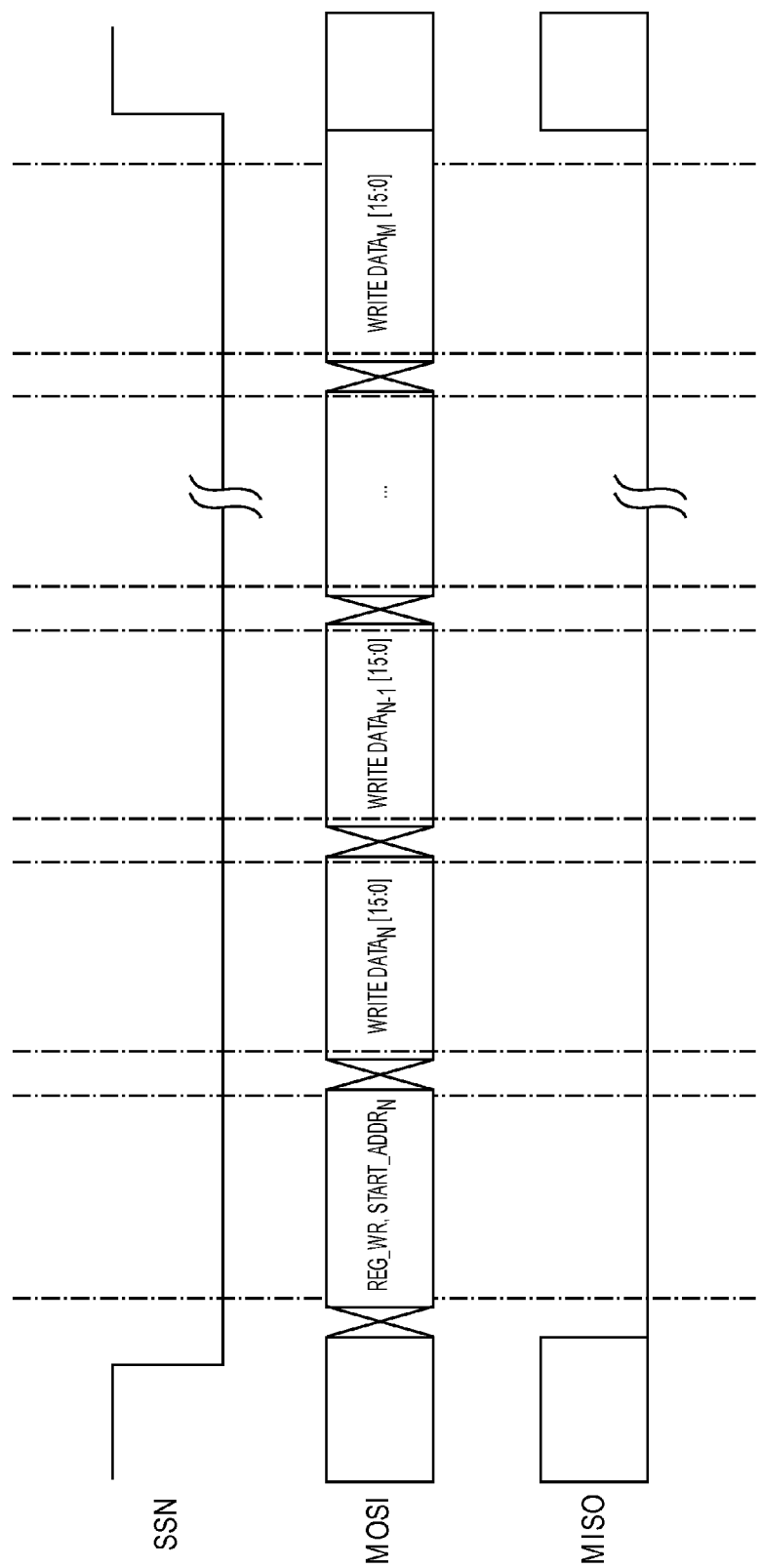
FIG. 4C shows a multiple register write operation when the digital interface and control module is in the serial peripheral interface slave configuration mode, according to an embodiment.
Figure 4D:
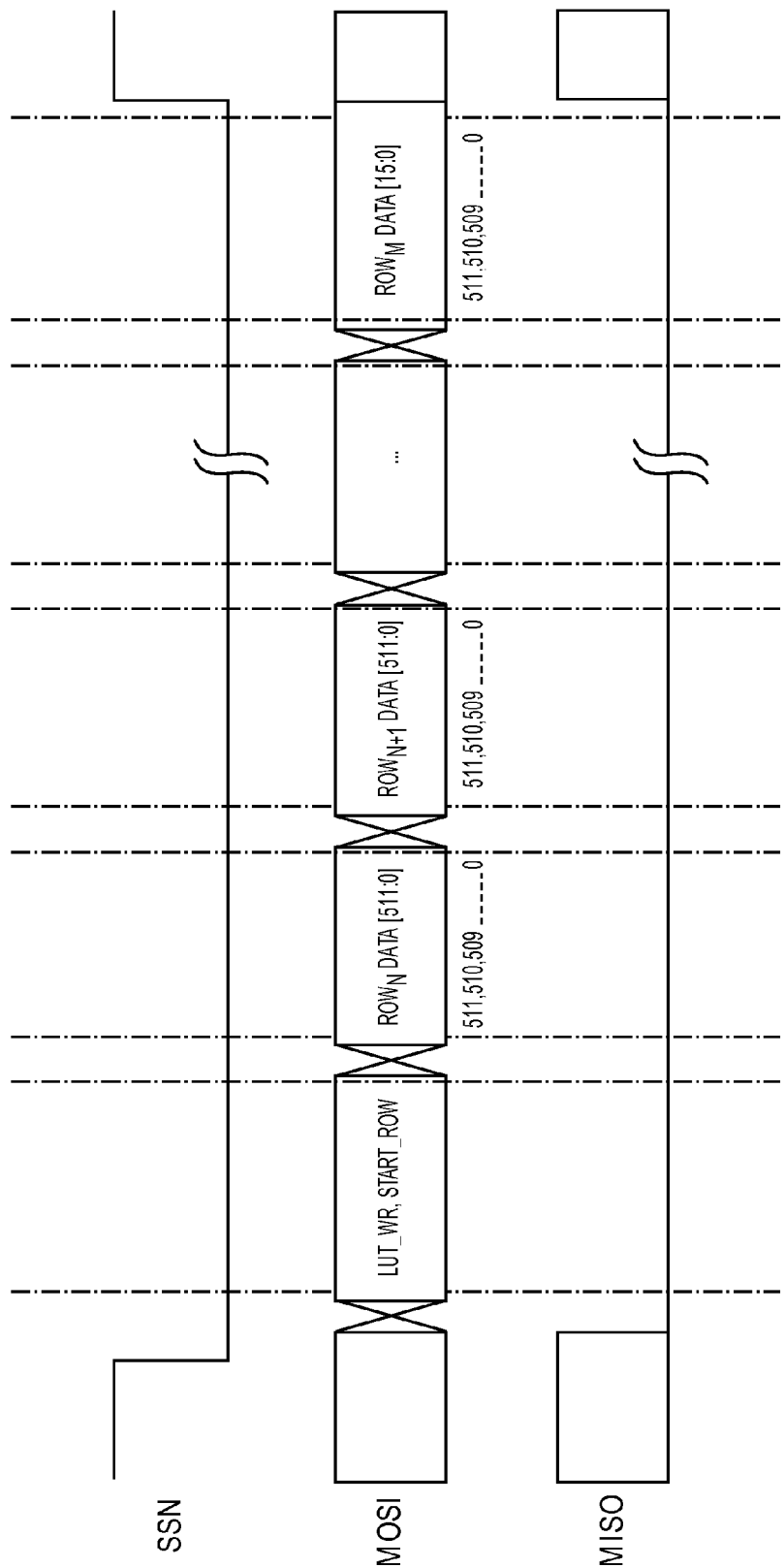
FIG. 4D shows an antenna lookup table memory write operation when the digital interface and control module is in the serial peripheral interface slave configuration mode, according to an embodiment.
Figure 4E:
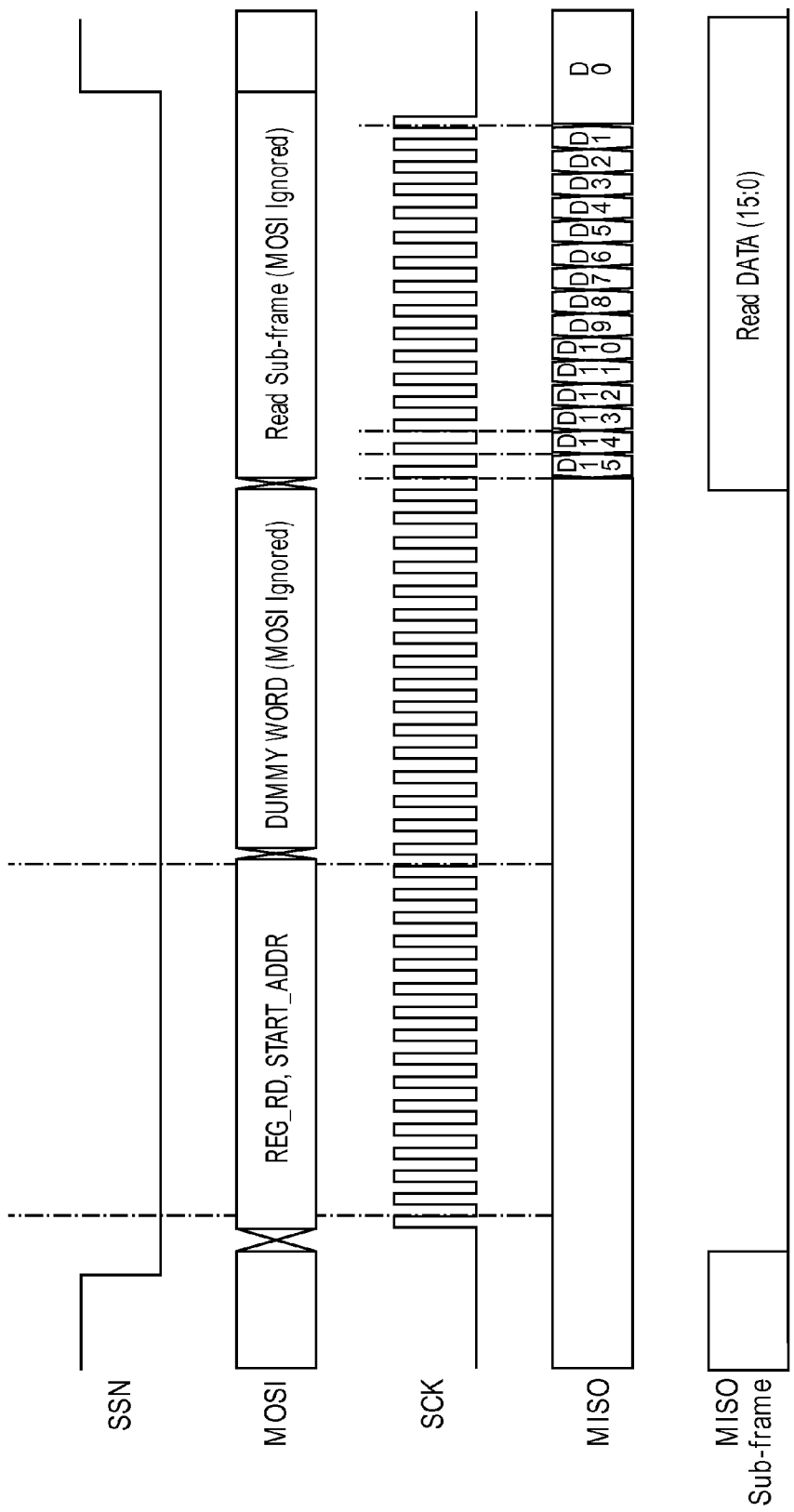
FIG. 4E shows a single register read operation when the digital interface and control module is in the serial peripheral interface slave configuration mode, according to an embodiment.
Figure 4F:
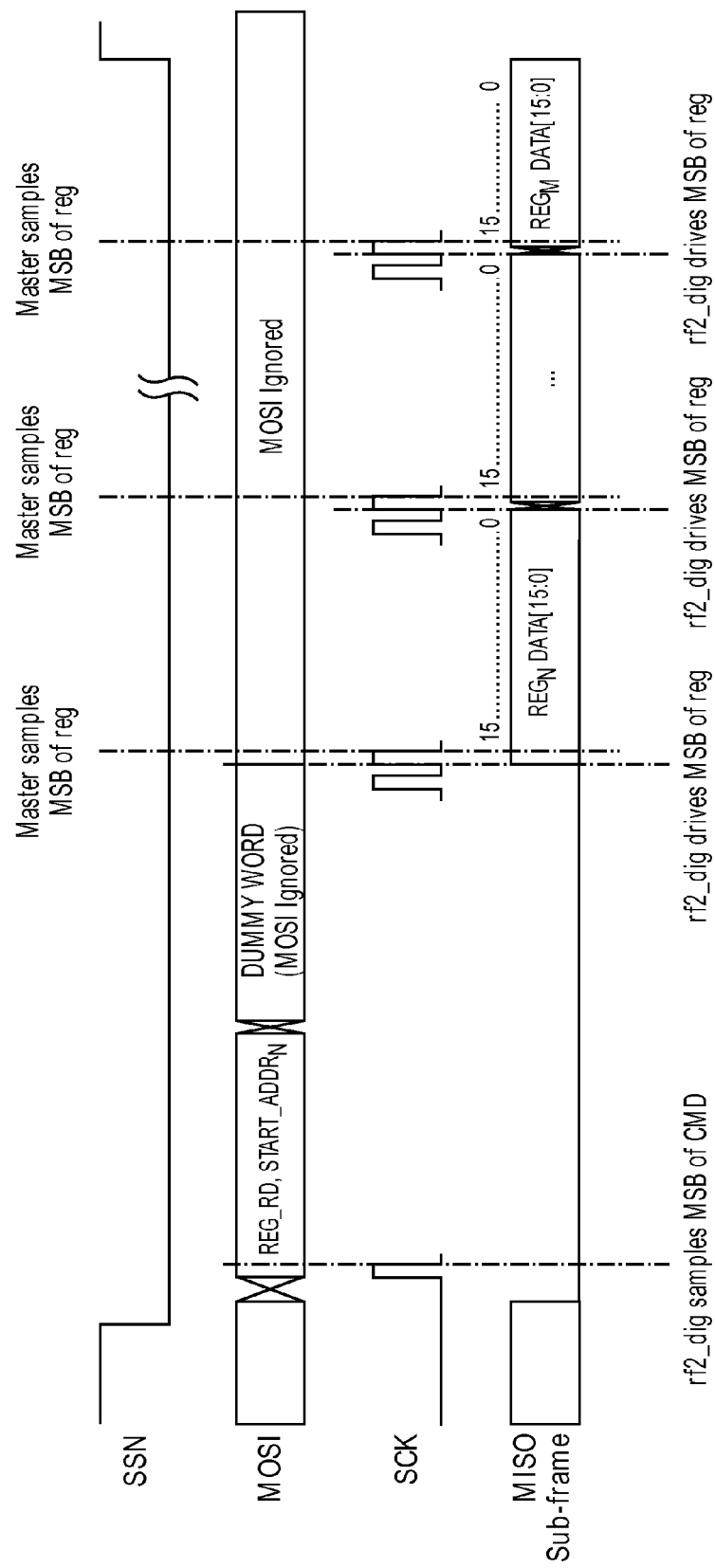
FIG. 4F shows a multiple register read operation when the digital interface and control module is in the serial peripheral interface slave configuration mode, according to an embodiment.
Figure 4G:
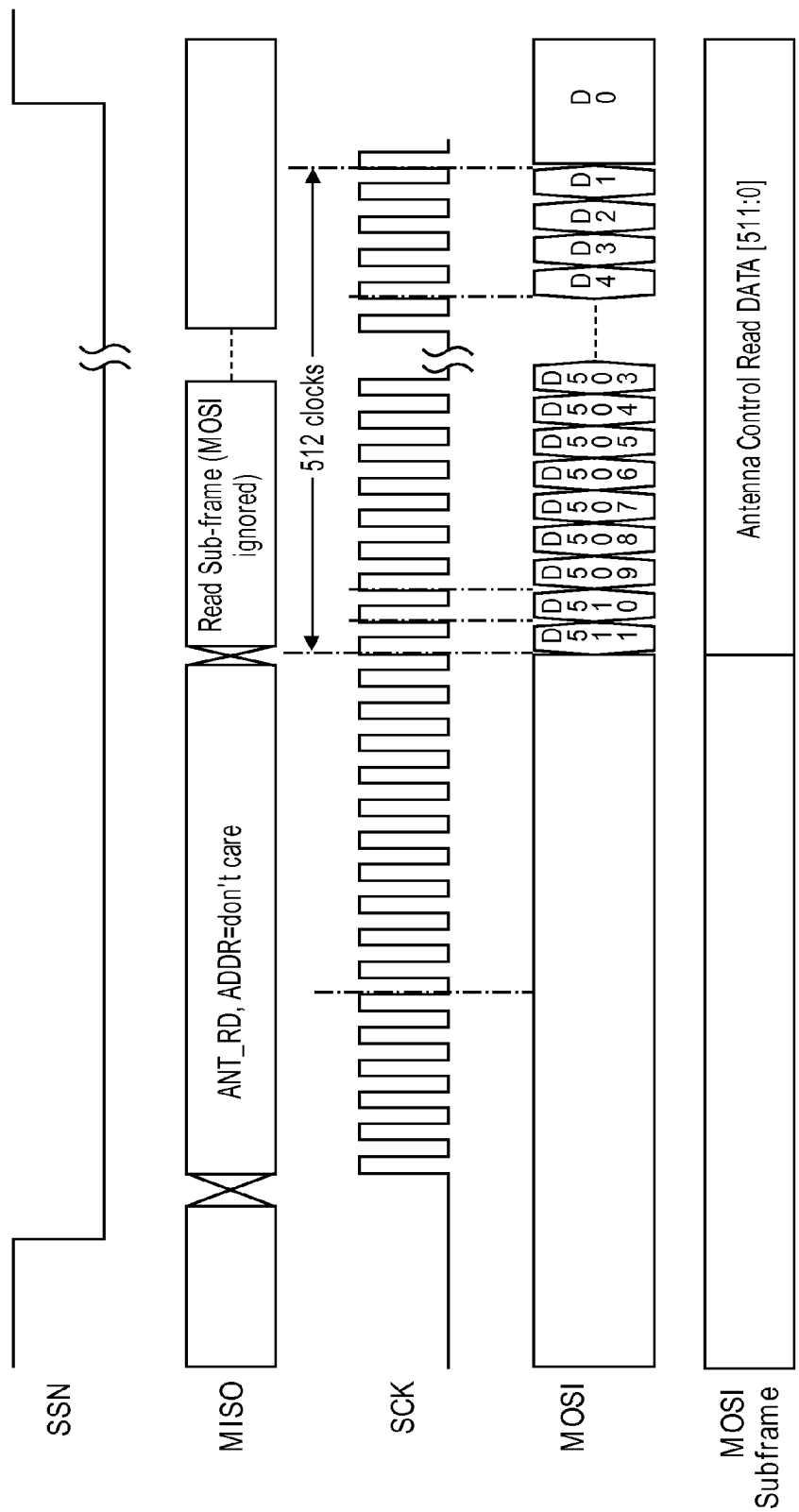
FIG. 4G shows a current antenna control value read operation when the digital interface and control module is in the serial peripheral interface slave configuration mode, according to an embodiment.

Various SPI access modes are shown in FIGS. 4A-4G. In particular, FIG. 4A shows the RCR_WR operation for writing to the RCR 308, according to an embodiment. FIG. 4B shows the REG_WR operation for writing to a single register of the register bank 306, according to an embodiment. FIG. 4C shows the REG_WR operation for writing to multiple registers of the register bank 306, according to an embodiment. FIG. 4D shows the LUT_WR operation for writing a single or multiples rows of the antenna LUT memory 304, according to an embodiment. FIG. 4E shows the REG_RD operation for reading a single register of the register bank 306, according to an embodiment. FIG. 4F shows the REG_RD operation for reading from multiple registers of the register bank 306, according to an embodiment. FIG. 4G shows the ANT_RD operation for reading an antenna control vector of the SPI controller 302, according to an embodiment.

For all of these access modes, the SPI slave controller 302 of the DIG module 102 captures the SPI input frames sent on data plane line 114-2 (SPI_MOSI) on the falling edge of the SPI clock signal sent on data plane line 114-0 (SPI_CLK). Examples of these capture edges are designated in FIGS. 4A-4G with lines 404. SPI_MOSI and SPI_CLK are designated in FIGS. 4A-4G as 406 and 408 respectively. The SPI_SSN is designated in FIGS. 4A-4G as 402. As shown in FIGS. 4A-4G, SPI_SSN is asserted low during each of the various SPI frame operations and de-asserted high when the frame operation is complete.

In an embodiment, for the register read operation (REG_RD), SPI_MISO on output line 118 is driven on the rising edge of SPI_CLK. SPI_MISO is indicated in FIGS. 4A-4G as 410. FIG. 4E, showing the single register read operation (single REG_RD), also shows examples of this rising edge with lines 412E. Similarly, FIG. 4F, showing the multiple register read operation (multiple REG_RD), also shows examples of this rising edge with lines 412F.

In an embodiment, the first bit of the data sub-frame(s) of the single and multiple register read operations (REG_RD) is driven on the line 118 (SPI_MISO) on the first rising edge of the SPI_CLK after the dummy sub-frame is received on line 114-2 (SPI_MOSI). This is done so that first bit of the data sub-frame(s) is available for sampling by the SPI driver 116 on the subsequent falling edge of the SPI_CLK. Also, this approach adheres to the clock polarity (CPOL)=0/clock phase (CPHA)=1 SPI timing mode. In an embodiment, all input and output SPI frames are treated as most-significant bit (MSB) first, including the antenna LUT memory 306 write operations (LUT_WR).

In an embodiment, when updating the RCR 308 using the RCR_WR operation, the most significant-bit 414A of the eleven (11)-bit control value is updated immediately as shown in FIG. 4A. By doing so, this allows the integrated clock gating (ICG) cell 314 (FIG. 3B) to latch in the enable signal 312 with the subsequent clock edges. The remainder ten bits 416A of the eleven (11)-bit control value are posted on the last SPI_MOSI data cycle as shown in FIG. 4A.

According to an embodiment, the REG_WR and LUT_WR operations support auto-bursting including continuous writing, with hardware auto-incrementing on the write address, of registers in the register bank 306 or rows of the antenna LUT memory 304. The SPI slave controller 302 may implement a number of safety features to detect and block erroneous write operations.

One safety feature the SPI slave controller 302 may implement is to block a REG_WR or LUT_WR command that specifies an out-of-range register or row address. For example, SPI slave controller 302 may block a LUT_WR command that specifies a row number greater than sixty-three (assuming the sixty four rows are addressed 0 to 63). The SPI slave controller 302 may transition into an invalid command state after blocking a REG_WR or LUT_WR command that specifies an out-of-range write address. The SPI slave controller 302 may automatically clear the invalid command state upon de-assertion of SPI_SSN.

Another safety feature the SPI slave controller 302 may implement is to not commit to memory the data of a data sub-frame of a REG_WR or LUT_WR command that is incomplete. For the REG_WR command, the data of a data sub-frame may be considered incomplete if the data is less than sixteen (16)-bits. For the LUT_WR command, the data of a data sub-frame may be considered incomplete if the data is less than five hundred and twelve (512)-bits. The SPI slave controller 302 may discard the incomplete data upon de-assertion of SPI_SSN.

Yet another safety feature the SPI slave controller 302 may implement is to mask and not wrap burst writes that start at a valid address but which end up crossing into an out-of-range address. For example, if a REG_WR operation specifies a register start address of 62 in a valid range of 0 to 63, any bits after the $32^{nd}$ bit may be ignored.

RAM Control Register (RCR)

According to an embodiment, the RCR 308 is an internal control register used to directly control power states and read margins of the antenna LUt memory 08. The RCR 308 may be written by the RCR_WR command. The outputs 316 (FIG. 3B) of the RCR 308 directly drive SRAM power-related control pins on the antenna LUT memory 304.

SPI Controller Implementation

In order to support the flexible random addressing and burst write capability without the need to specify burst length, the SPI slave controller 302 needs to be capable of committing shift register contents to register bank 306 and antenna LUT memory 304 without extra clock edges. In an embodiment, to accomplish this, the SPI slave controller 302 makes use of the SPI_SSN signal as the frame start and frame end indicator.

In an embodiment, the SPI slave controller 302 encompasses a state machine implemented one or more internal state registers. The state machine is enabled when SPI_SSN is asserted low. The state machine is reset with the SPI_SSN is subsequently de-asserted high. For each register bank 306 or RCR 308 word to write or antenna LUT memory 304 row to write, the SPI slave controller 302 generates a write-enable which is implemented by an internal state register. The write-enable is used by either the antenna LUT memory 304, RCR 308, or register bank 306 to qualify the last falling edge of SPI_CLK at those memories' write clocks. In an embodiment, each of the antenna LUT memory 304, RCR 308, or register bank 306 have a write clock driven by SPI_CLK. The write-enable is pulsed on the cycle of either bit-sixteen (16) (for register bank 306 and RCR 308 writes) or bit-five hundred and twelve (512) (for antenna LUT memory 304 writes) being available on the MOSI pin 318. For the final word or row to be written, the write-enable is cleared via SPI_SSN going high. This resets the SPI slave controller 302.

Figure 5:
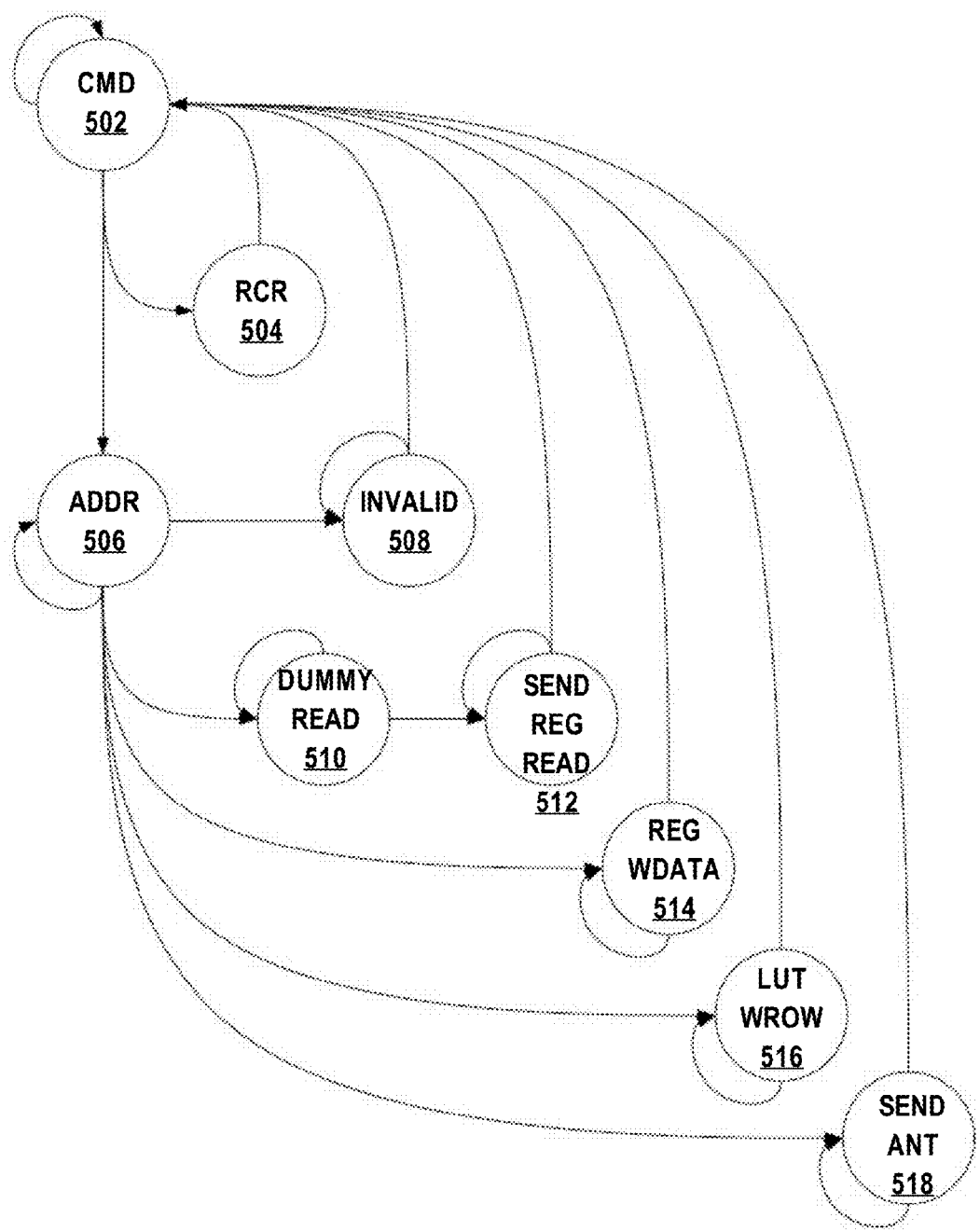
FIG. 5 is a state diagram of a state machine of a serial peripheral interface slave controller module of the digital interface and control module of the present invention, according to an embodiment.

This SPI_SSN based approach allows for lower protocol overhead which enables lower latency register access and simplifies the design. FIG. 5 is a state diagram of the state machine of the SPI slave controller module 302 of the DIG module 102, according to an embodiment.

One the first falling edge of SPI_CLK when SPI_SSN is asserted low, the CMD state 502 becomes active and the SPI controller 302 immediately captures the first five (5) bits of the command frame and stores the five bits in a command register.

If the captured command is RCR_RW, the SPI controller 302 immediately transitions to the RCR state 504. At state 504, the SPI controller 302 captures the eleven (11)-bit control value. The SPI controller 302 then updates the RCR 308 based on the control value and the RCR_RW command ends.

If the command captured at state 502 is not RCR_WR, then the SPI controller 302 transitions to the ADDR state 506. At the ADDR state 506, the eleven (11)-bit start address is captured. Also at the ADDR state 506, the previously stored command register is decoded as the last bit of the start address is being received. This causes the state machine to transition to branch to one of five possible paths.

If the command in the command register is not a valid command (e.g., is not one of commands in Table 1 above) or the start address refers to an non-existent register in register bank 306 or a non-existent row in antenna LUT memory 304, then the SPI controller 302 transition to the INVALID state 508. The SPI controller 302 remains in state 508 until the frame operation completes when SPI_SSN rises. No memory operations occur as a result.

If the command in the command register is REG_RD, then the SPI controller 302 transitions to the DUMMY_READ state 510 for sixteen (16) clocks. At this time, the read-address as captured in the command address is being driven to the register bank 306. On the $15^{th}$ cycle, the value from the register bank 306 for the start address is captured into a data shift register of the SPI controller 302. After the sixteen (16) clocks, the SPI controller 302 transitions to the SEND_REG_RED state 512. In the SEND_REG_READ state 512, the shift register is shifted out to the MISO pin 320, after which time the SPI slave controller 302 holds until SPI_SSN rises. The next register or next address is automatically loaded after the $15^{th}$ clock cycle to allow subsequent reads for burst operations.

If the command in the command register is REG_WR, then the SPI controller 302 transitions to the REG_WDATA state 514. In state 514, the SPI controller 302 continuously shifts sixteen (16)-bits at a time into a data register of the SPI controller 302 and pulses the write enable as the $16^{th}$ bit is captured. The SPI controller 302 repeats this process until SPI_SSN rises. The rising of SPI_SSN causes the last write-enable being driven high to be cleared low. The address to the register bank 306 is based on the addition of the command start address and appropriate most significant bits of an internal bit counter of the SPI controller 302. The internal bit counter is incremented for every data bit received.

If the command in the command register is LUT_WR, then the SPI controller 302 transitions to the LUT_WROW state 516. State 516 is similar to state 514 except that each cycle is repeated every five hundred and twelve (512) bits and the higher most significant bits of the bit counter are used in conjunction with the command start address to form the address into the antenna LUT memory 304.

If the command in the command register is ANT_RD, then the SPI controller 302 transitions to the SEND_ANT state 518 with the most significant bit being made available on SPI_MISO on the last ADDR state 506 cycle. In the SEND_ANT state 518, an antenna control vector of the SPI controller 302 is shifted out to the MISO pin 320 over five hundred and twelve (512) cycles in total.

Dynamic Antenna Configuration Mode

Figure 6:
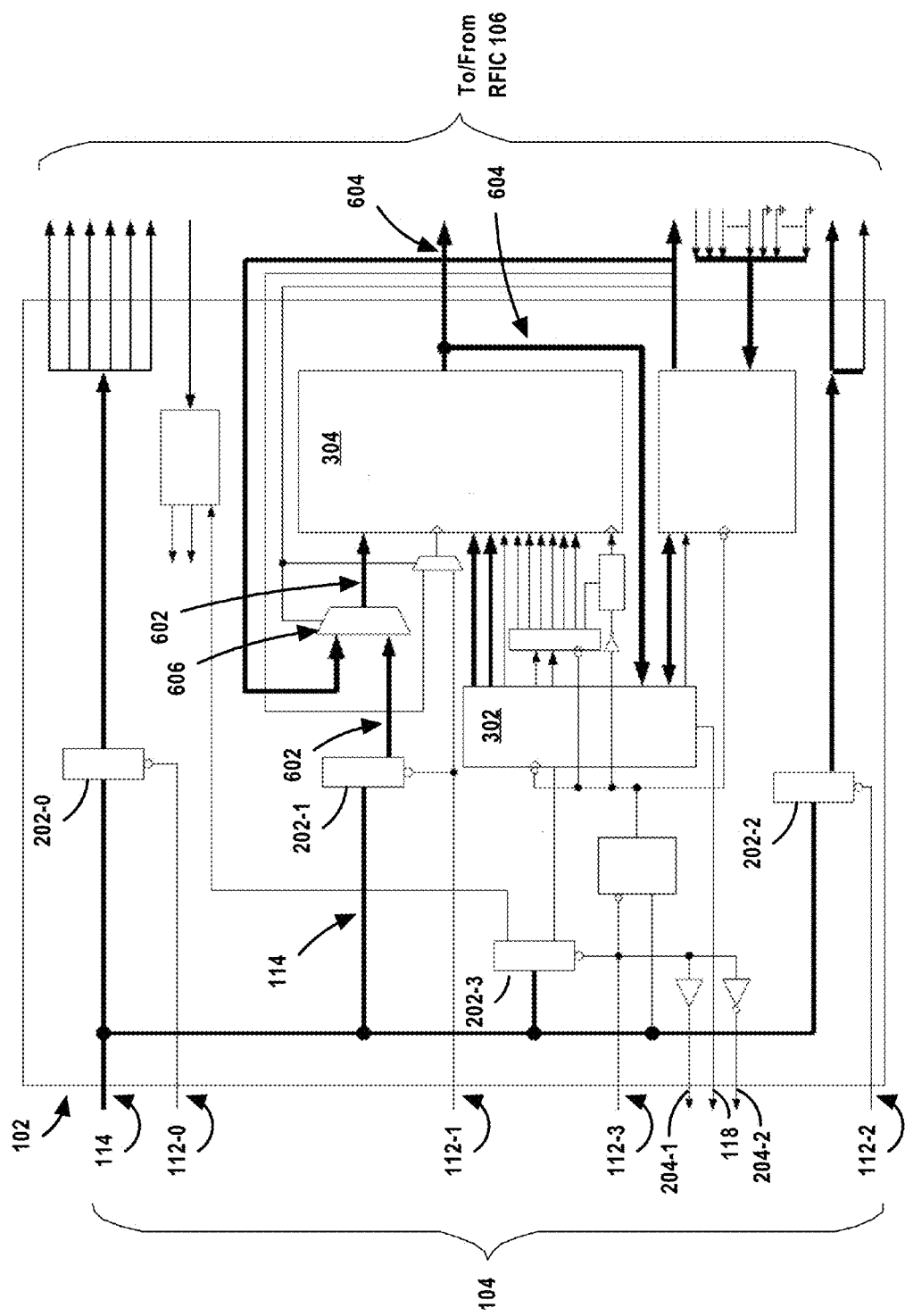
FIG. 6 is a block circuit diagram showing the digital interface and control module and the multi-function digital bus of the present invention in greater detail when the digital interface and control module is in a dynamic antenna configuration mode, according to an embodiment.

Turning now to FIG. 6, in an embodiment, the dynamic antenna configuration mode is selected by asserting mode selection line 112-1 low (0) and the remaining mode selection lines 112-0, 112-2, and 112-3 high (1). In this mode, the data plane 114 carries a six (6)-bit address/index into the antenna LUT memory 304 that selects one of the sixty four (64) antenna control vectors stored in the memory 304. In an embodiment, the six (6)-bit address/index is a value between zero (0) and sixty three (63) that selects one of sixty-four (64) rows of the memory 304. Each of the 64 rows stores a five hundred and twelve (512) antenna control vector.

Figure 7:
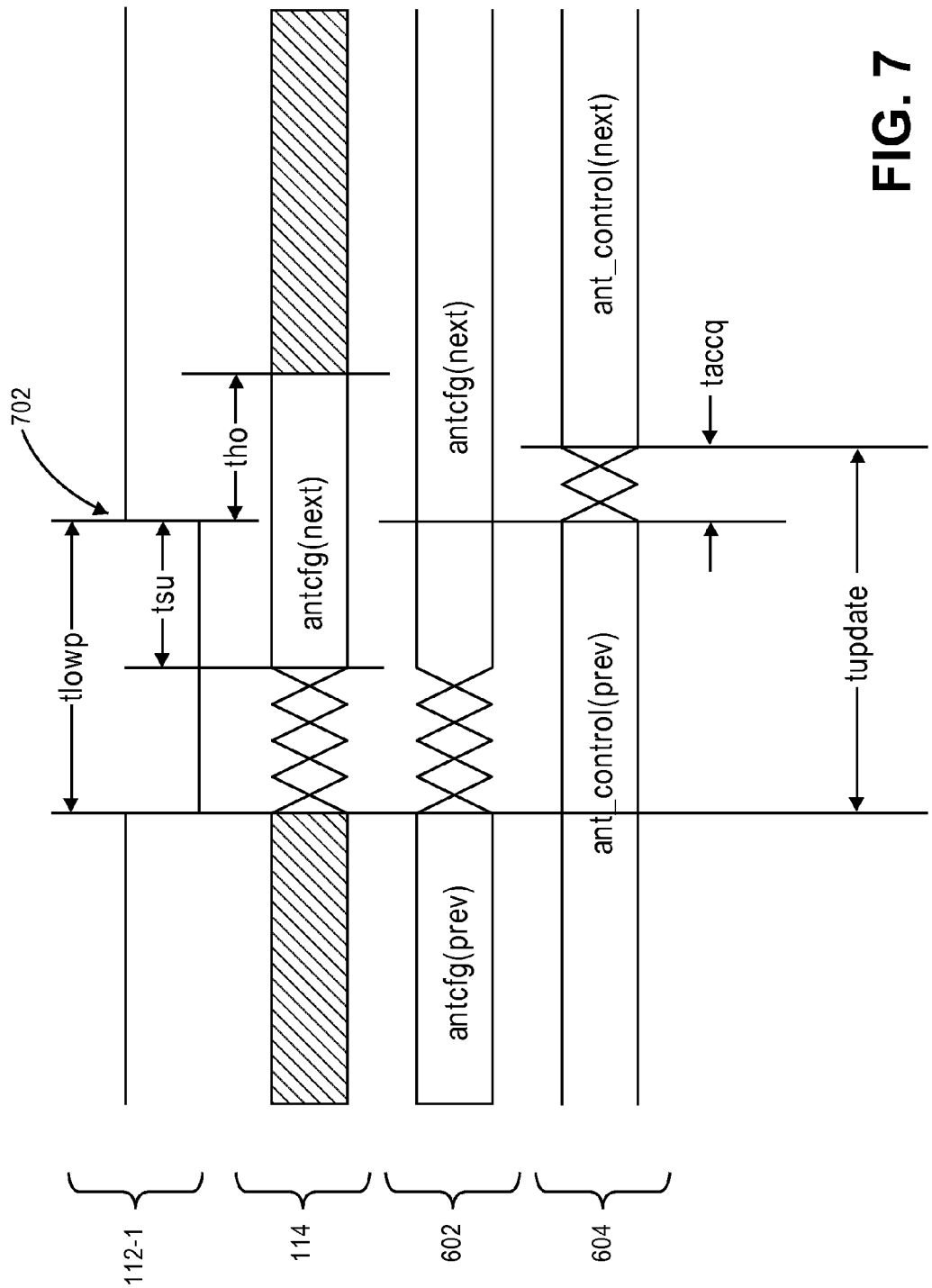
FIG. 7 shows a dynamic antenna configuration operation when the digital interface and control module is in the dynamic antenna configuration mode, according to an embodiment.

Turning now to FIG. 7, it shows how mode selection line 112-1 is used as both the latch 202-1 enable and SRAM clock rising edge for dynamic antenna mode selection. At the rising edge 702 of the signal on the dynamic antenna configuration mode selection line 112-1, the latch 202-1 closes and the value in the latch 202-1 becomes the 6-bit address/index which is used by the SRAM of the antenna LUT memory 304 to clock out the LUT data 604 for the given 6-bit address/index. The address/index is sent from the latch 202-1 to the memory 604 along a data path 602 that connects the latch 202-1 to the memory 304. The data path 602 has a bit-width equal to the bit-length of the address/index. In this example, the latch 202-1 and the memory 604 are connected via a multiplexer 606. However, connection via the multiplexer 606 is not required and the latch 202-1 and the memory 604 may be connected directly instead.

In this example, the selected five hundred and twelve (512)-bit antenna control vector 604 is output to the RFIC 106 and also to the SPI slave controller 302 as shown in FIG. 6. The selected antenna control vector 604 is stored in a register of the SPI controller 302 for read out using the ANT_RD SPI command described above. In other embodiments, the selected antenna control vector 604 is output only to the RFIC 106 and not also the SPI slave controller 302.

The selected antenna control vector 604 can control a number of different antenna controls in the RF RX path and the RF TX path of the RFIC 106. The selected antenna control vector 604 can include both RF RX path and RF TX path controls.

Figure 10:
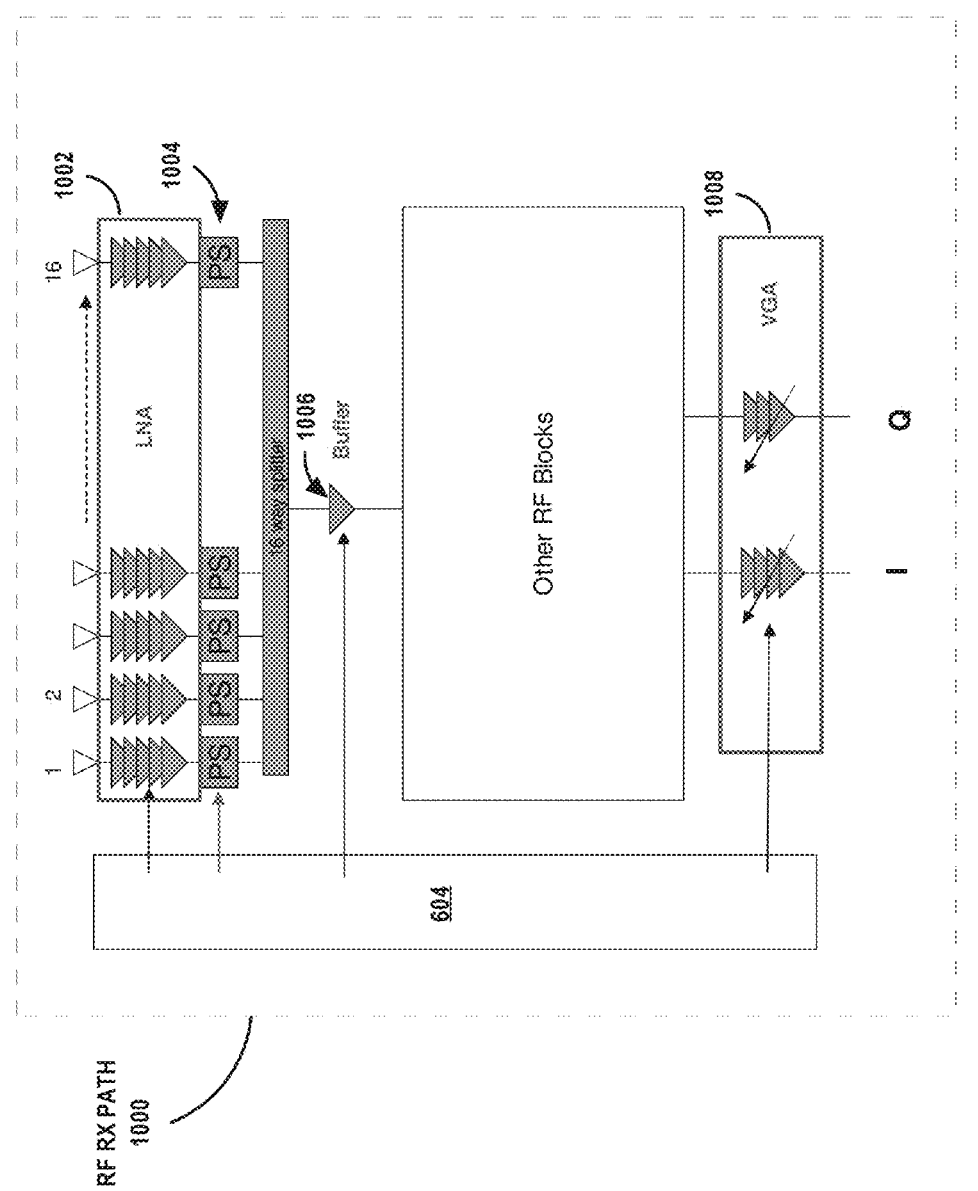
FIG. 10 is a block circuit diagram showing a radio frequency receive path in a radio frequency integrated circuit controllable in the dynamic antenna configuration mode via the digital interface and control module and the multi-function digital bus of the present invention, according to an embodiment.

FIG. 10 shows components in a RF RX path 1000 of the RFIC 106 that may be controlled by the selected antenna control vector 604. The controllable components include sixteen (16) low noise amplifiers 1002 connected to sixteen (16) receive (RX) antennas, sixteen (16) thirty-two (32) step phase shifters 1004, a buffer 1006, and two (2) thirty-two (32) step at 1.5 decibels (dBs) each variable gain amplifiers 1008. The sixteen (16) receive antennas may be just receive (RX) capable or both receive (RX) and transmit (TX) capable. The selected antenna control vector 604 may include on/off settings for each of the low noise amplifiers 1002, high/low gain setting for the buffer 1006, shifting angle and phase shifter gain settings for each of the phase shifters 1004, and common I/Q gain setting for the variable gain amplifiers 1008. Other gain settings are possible in alternative implementations including high/low gain settings for each of the low noise amplifiers 1002, high/low gain settings for additional buffer stages, and separate I/Q gain settings for the variable gain amplifiers 1008.

Figure 11:
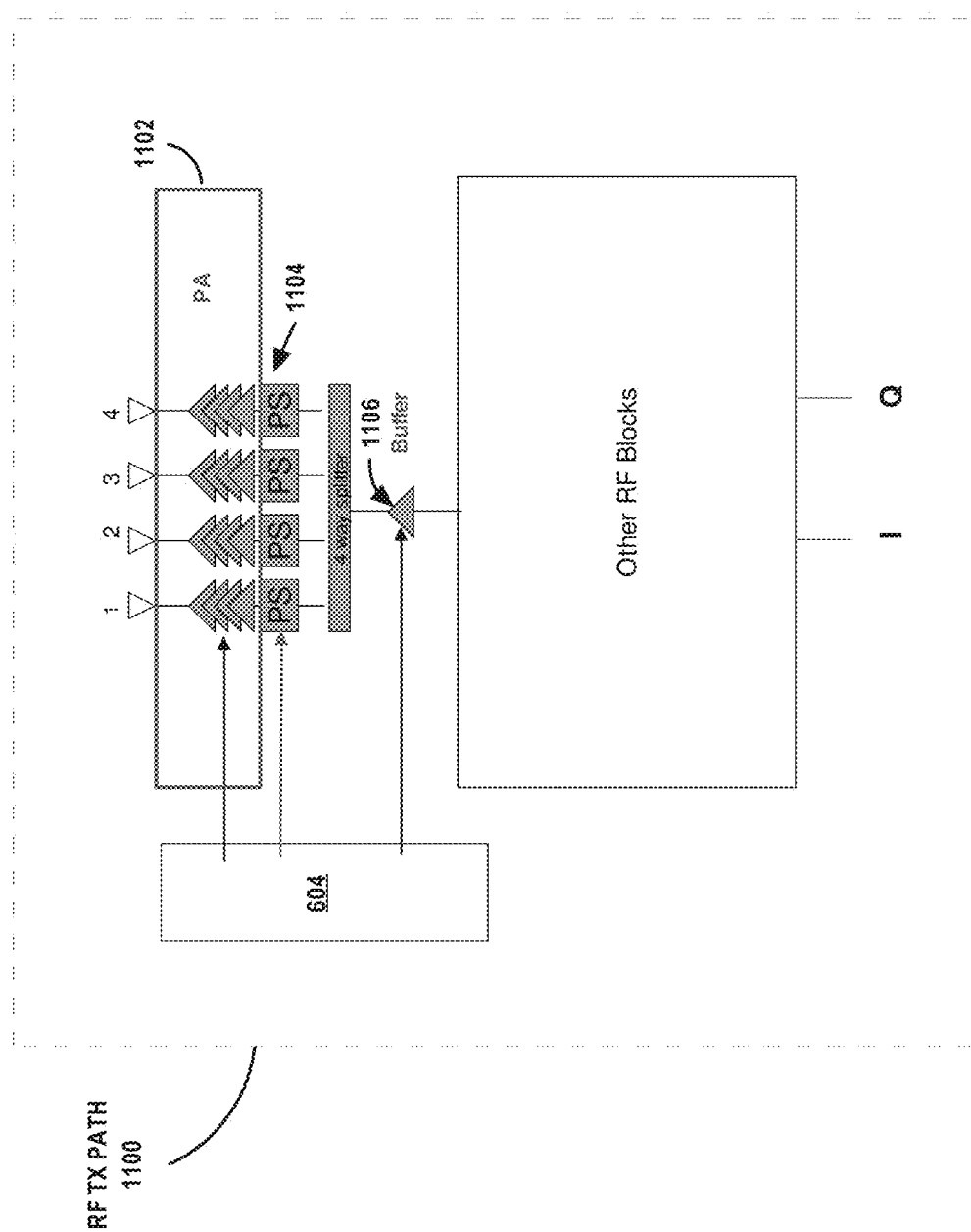
FIG. 11 is a block circuit diagram showing a radio frequency transmit path in a radio frequency integrated circuit controllable in the dynamic antenna configuration mode via the digital interface and control module and the multi-function digital bus of the present invention, according to an embodiment.

FIG. 11 shows components in a RF TX path 1100 of the RFIC 106 that may be controlled by the selected antenna control vector 604. The components include four (4) power amplifiers 1102 connected to four (4) transmit (TX) antennas, four (4) thirty-two (32) step phase shifters 1104, and a buffer 1106. The four (4) transmit (TX) antennas can just transmit (TX) capable or both transmit (TX) and receive (RX) capable. The selected antenna control vector 604 may include on/off settings for each of the power amplifiers 1102, a high/low gain setting for the buffer 1106, and shifting angle and phase shifter gain settings for each of the phase shifters 1104. Other gain settings are possible in alternative implementations including high/low gain settings for each of the power amplifiers 1102 and high/low gain settings for additional buffer stages.

RF Mode Select Mode

Figure 8:
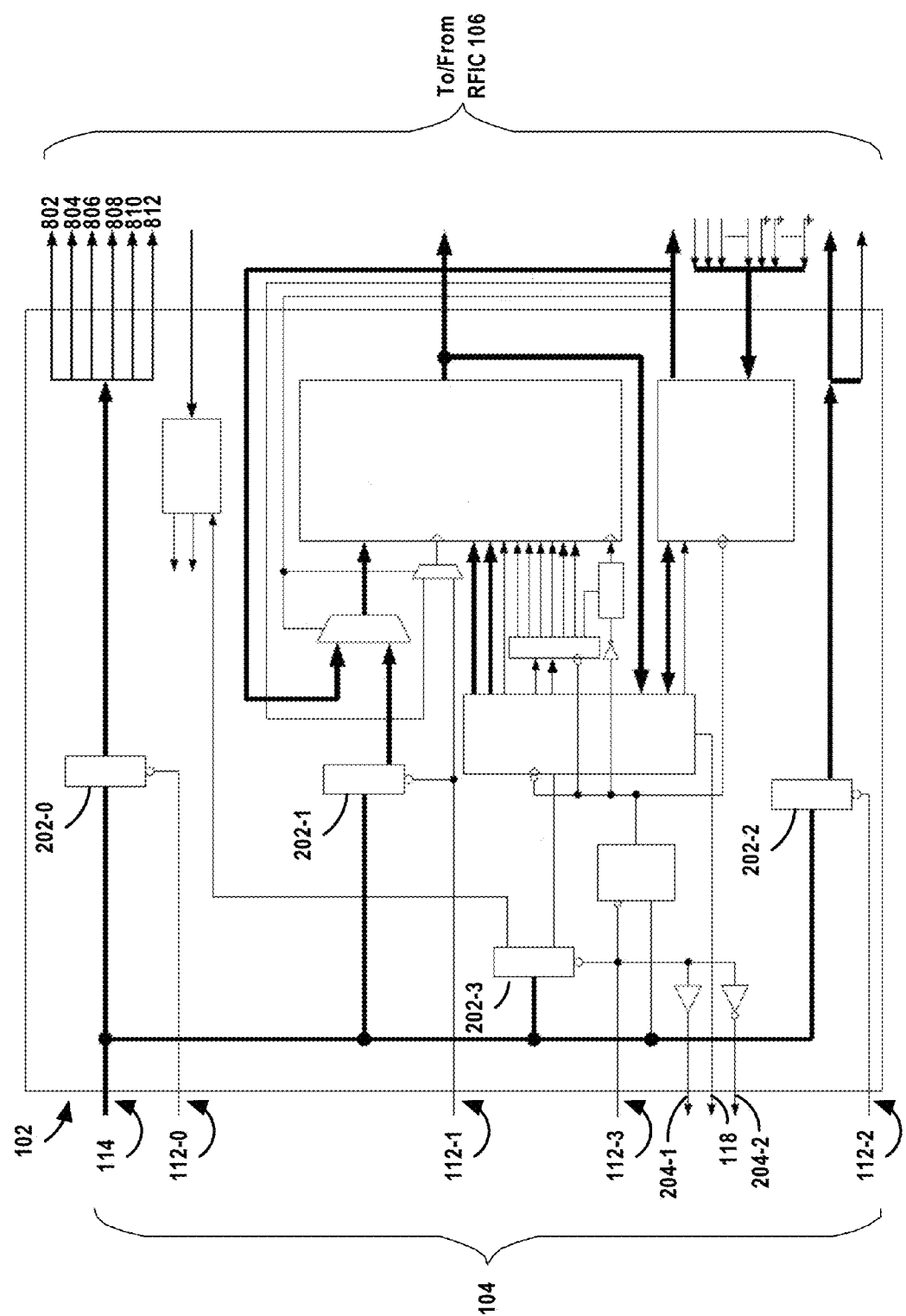
FIG. 8 is a block circuit diagram showing the digital interface and control module and the multi-function digital bus of the present invention in greater detail when the digital interface and control module is in the RF mode select mode, according to an embodiment.

Turning now to FIG. 8, in an embodiment, a RF mode select mode is selected by asserting mode selection line 112-0 low (0) and the remaining mode selection lines 112-1, 112-2, and 112-3 high (1). In this mode, the data plane 114 is used for direct low latency control of outputs 802, 804, 806, 808, 810, and 812 to the RFIC 106. The low latency control is achieved in part by using latch 202-0.

In an embodiment, output 802 is a RF power enable, output 804 is a crystal (XTAL) oscillator enable, output 806 is a phase locked loop (PLL) enable, output 808 is a transmission (TX) mode enable, output 810 is a transmission (TX) power amplifier (PA) gain, and output 812 is a receive (RX) mode enable.

RX Gain Update Mode

Figure 9:
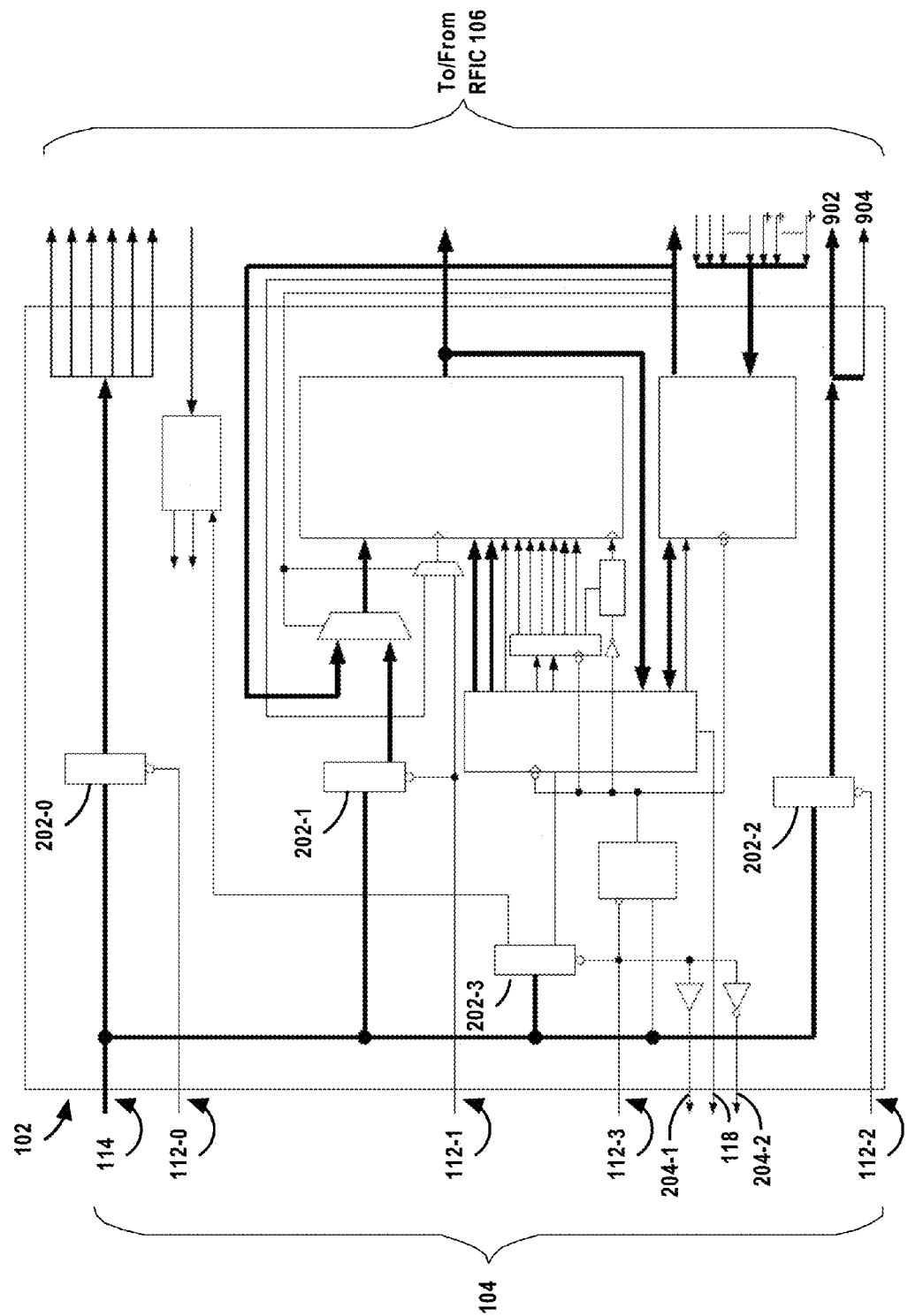
FIG. 9 is a block circuit diagram showing the digital interface and control module and the multi-function digital bus of the present invention in greater detail when the digital interface and control module is in a receive gain update mode, according to an embodiment.

Turning now to FIG. 9, in an embodiment, a receive (RX) gain update mode is selected by asserting mode selection line 112-2 low (0) and the remaining mode selection lines 112-0, 112-1, and 112-3 high (1). In this mode, the data plane 114 is used for direct low latency control of outputs 902 and 904 to the RFIC 106. The low latency control is achieved in part by using latch 202-2.

In an embodiment, output 904 is a five (5)-bit variable gain amplifier (VGA) control and output 904 is a one (1)-bit low noise amplifier (LNA) control.

CONCLUSION

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An integrated circuit for a multi-gigabit wireless communications device, the integrated circuit comprising:
   a memory for storing a plurality of radio frequency antenna control vectors, each of the plurality of radio frequency antenna control vectors having a bit-length;

wherein the bit-length of each of the plurality of radio frequency antenna control vectors is greater than the number of the plurality of radio frequency antenna control vectors stored in the memory;
a first latch connected to the memory via a first data path, the first data path having a bit-width, the number of the plurality of radio frequency antenna control vectors stored in the memory equal to two to the power of the bit-width of the first data path;
a first latch enable pin connected to the first latch, the first latch enable pin operative to receive a latch enable signal and the first latch operative to close at a rising edge of the latch enable signal;
a plurality of data pins connected to the first latch, the number of the plurality of data pins equal to the bit-width of the first data path, said plurality of data pins operative to receive an index that selects one of the plurality of radio frequency antenna control vectors stored in the memory; and
said memory operative to receive the index from the first latch and output the selected radio frequency antenna control vector from the memory responsive to the first latch closing at the rising edge of the latch enable signal.

2. The integrated circuit of claim 1, wherein:
the bit-length of each of the plurality of radio frequency antenna control vectors is five hundred and twelve (512);
the number of the plurality of radio frequency antenna control vectors stored in the memory is sixty four (64); and
the bit-width of the first data path is six (6).

3. The integrated circuit of claim 1, further comprising:
a serial peripheral interface slave controller;
a second latch connected to the serial peripheral interface slave controller by a signal line;
a second latch enable pin connected to the second latch, the second latch enable pin operative to receive a latch enable signal; and
a first one of the plurality of data pins connected to the second latch and operative to receive a serial peripheral interface master output slave input signal when the latch enable signal is received on the second latch enable pin;
a second one of the plurality data pins also connected to the second latch and operative to receive a serial peripheral interface slave select signal when the latch enable signal is received on the second latch enable pin;
a third one of the plurality of data pins operative to receive a serial peripheral interface clock signal when the latch enable signal is received on the second latch enable pin; and
wherein the second latch is operative to send the serial peripheral interface master output slave input signal to the serial peripheral interface slave controller via the signal line when the latch enable signal is received on the second latch enable pin.

4. The integrated circuit of claim 1, further comprising:
a second latch;
a second latch enable pin connected to the second latch, the second latch enable pin operative to receive a latch enable signal;
the plurality of data pins connected to the second latch;
wherein at least one of the plurality of data pins is operative to receive a variable gain amplifier setting signal when the latch enable signal is received on the second latch enable pin; and
wherein at least one other of the plurality of data pins is operative to receive a low noise amplifier setting signal when the latch enable signal is received on the second latch enable pin.

5. The integrated circuit of claim 1, further comprising:
a second latch;
the plurality of data pins connected to the second latch;
a second latch enable pin connected to the second latch, the second latch enable pin operative to receive a latch enable signal;
wherein a first one of the plurality of data pins is operative to receive a radio frequency power enable signal when the latch enable signal is received on the second latch enable pin;
wherein a second one of the plurality of data pins is operative to receive a crystal oscillator enable signal when the latch enable signal is received on the second latch enable pin;
wherein a third one of the plurality of data pins is operative to receive a phase locked loop enable signal when the latch enable signal is received on the second latch enable pin;
wherein a fourth one of the plurality of data pins is operative to receive a transmission mode enable signal when the latch enable signal is received on the second latch enable pin;
wherein a fifth one of the plurality of data pins is operative to receive a transmission power amplifier gain signal when the latch enable signal is received on the second latch enable pin; and
wherein a sixth one of the plurality of data pins is operative to receive a receive mode enable signal when the latch enable signal is received on the second latch enable pin.

6. The integrated circuit of claim 1, wherein the integrated circuit is integrated in a radio frequency integrated circuit as a hard macro.

7. The integrated circuit of claim 1, wherein the selected radio frequency antenna control vector comprises:
on/off settings for each of a plurality of low noise amplifiers, each of the plurality of low noise amplifiers connected to a corresponding receive antenna;
shifting angle and phase shifter gain settings for each of a plurality of phase shifters, each of the plurality of phase shifters connected to a corresponding one of the low noise amplifiers;
a high/low gain setting for a buffer connected to the plurality of phase shifters via a splitter; and
a common I/Q gain setting for a plurality of variable gain amplifiers.

8. The integrated circuit of claim 1, wherein the selected radio frequency antenna control vector comprises:
on/off settings for each of a plurality of power amplifiers, each of the plurality of power amplifiers connected to a corresponding transmit antenna;
shifting angle and phase shifter gain settings for each of a plurality of phase shifters, each of the plurality of phase shifters connected to a corresponding one of the power amplifiers; and
a high/low gain setting for a buffer connected to the plurality of phase shifters via a splitter.

9. The integrated circuit of claim 1, wherein the selected radio frequency antenna control vector comprises the settings of claim 7 and the settings of claim 8.

10. The integrated circuit of claim 1, wherein the memory comprises one or more synchronous random access memory (SRAM) devices.

11. The integrated circuit of claim 1, wherein the first path comprises a multiplexer; and wherein the first latch and the memory are connected via the multiplexer.

12. A wireless communications device comprising the integrated circuit of claim 1.

13. A wireless communications device comprising the integrated circuit of claim 2.

14. A wireless communications device comprising the integrated circuit of claim 3.

15. A wireless communications device comprising the integrated circuit of claim 4.

16. A wireless communications device comprising the integrated circuit of claim 5.

17. A wireless communications device comprising the integrated circuit of claim 6.

18. A wireless communications device comprising the integrated circuit of claim 7.

19. A wireless communications device comprising the integrated circuit of claim 8.

20. A wireless communications device comprising the integrated circuit of claim 9.

21. A wireless communications device comprising the integrated circuit of claim 10.

22. A wireless communications device comprising the integrated circuit of claim 11.

* * * * *